(12) United States Patent
Matsumoto et al.

(10) Patent No.: US 7,000,050 B2
(45) Date of Patent: Feb. 14, 2006

(54) APPARATUS, METHOD AND PROGRAM FOR CONTENTION ARBITRATION

(75) Inventors: Michiko Matsumoto, Moriguchi (JP); Yoshiaki Suzuki, Osaka (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 224 days.

(21) Appl. No.: 10/712,001

(22) Filed: Nov. 14, 2003

(65) Prior Publication Data

US 2004/0098526 A1    May 20, 2004

(30) Foreign Application Priority Data

Nov. 15, 2002    (JP) ............... 2002-331905

(51) Int. Cl.
*G06F 12/00*    (2006.01)
(52) U.S. Cl. .............. 710/240; 709/223; 709/225
(58) Field of Classification Search ............... 709/223, 709/225, 227; 710/240; 707/8
See application file for complete search history.

(56) References Cited

U.S. PATENT DOCUMENTS

| | | | |
|---|---|---|---|
| 5,933,825 A * | 8/1999 | McClaughry et al. .......... 707/8 |
| 5,968,175 A * | 10/1999 | Morishita et al. ........... 713/200 |
| 6,023,232 A * | 2/2000 | Eitzenberger ............... 340/988 |
| 6,466,982 B1 * | 10/2002 | Ruberg ....................... 709/227 |
| 6,781,363 B1 * | 8/2004 | Chen ........................ 324/158.1 |
| 6,801,962 B1 * | 10/2004 | Taniguchi et al. ............ 710/33 |

FOREIGN PATENT DOCUMENTS

| JP | 10-187527 | 7/1998 |
|---|---|---|
| JP | 2000-231458 | 8/2000 |
| JP | 2001-346276 | 12/2001 |
| JP | 2002-175287 | 6/2002 |
| JP | 2004-508611 | 3/2004 |

\* cited by examiner

*Primary Examiner*—Rehana Perveen
*Assistant Examiner*—Brian Misiura
(74) *Attorney, Agent, or Firm*—Wenderoth, Lind & Ponack, L.L.P.

(57) ABSTRACT

The present invention provides a contention arbitration apparatus and method which can fully utilize the advantages of physical devices and can be flexibly adapted to a change of the physical devices. A contention arbitration apparatus 1 includes: a resource information storing section 14 for storing resource information; a device information storing section 18 for storing device information indicating a correspondence between a logic device and resources; a used resource recognizing section 13 for recognizing a resource associated with the logic device; a resource access determining section 15 for determining by reference to the resource information which application program is allowed to access the resource recognized by the used resource recognizing section; and a device access determining section 16 for determining, based on a determination result provided by the resource access determining section, whether the application program which has specified the logic device is able to access a physical device which implements functions defined by the logic device.

21 Claims, 13 Drawing Sheets

F I G. 1
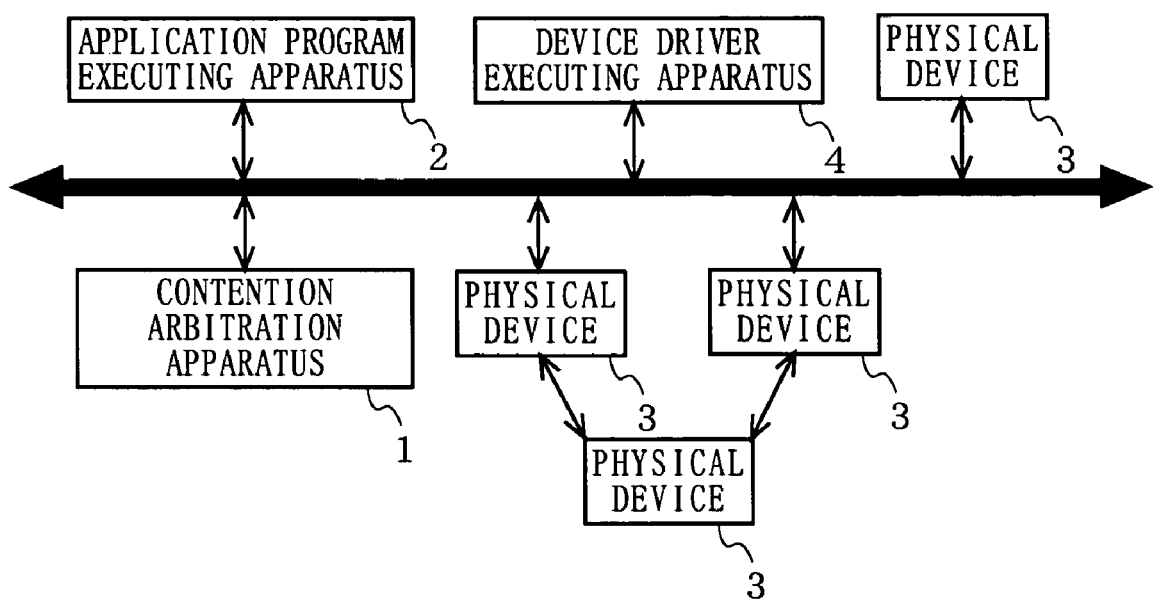

F I G. 5
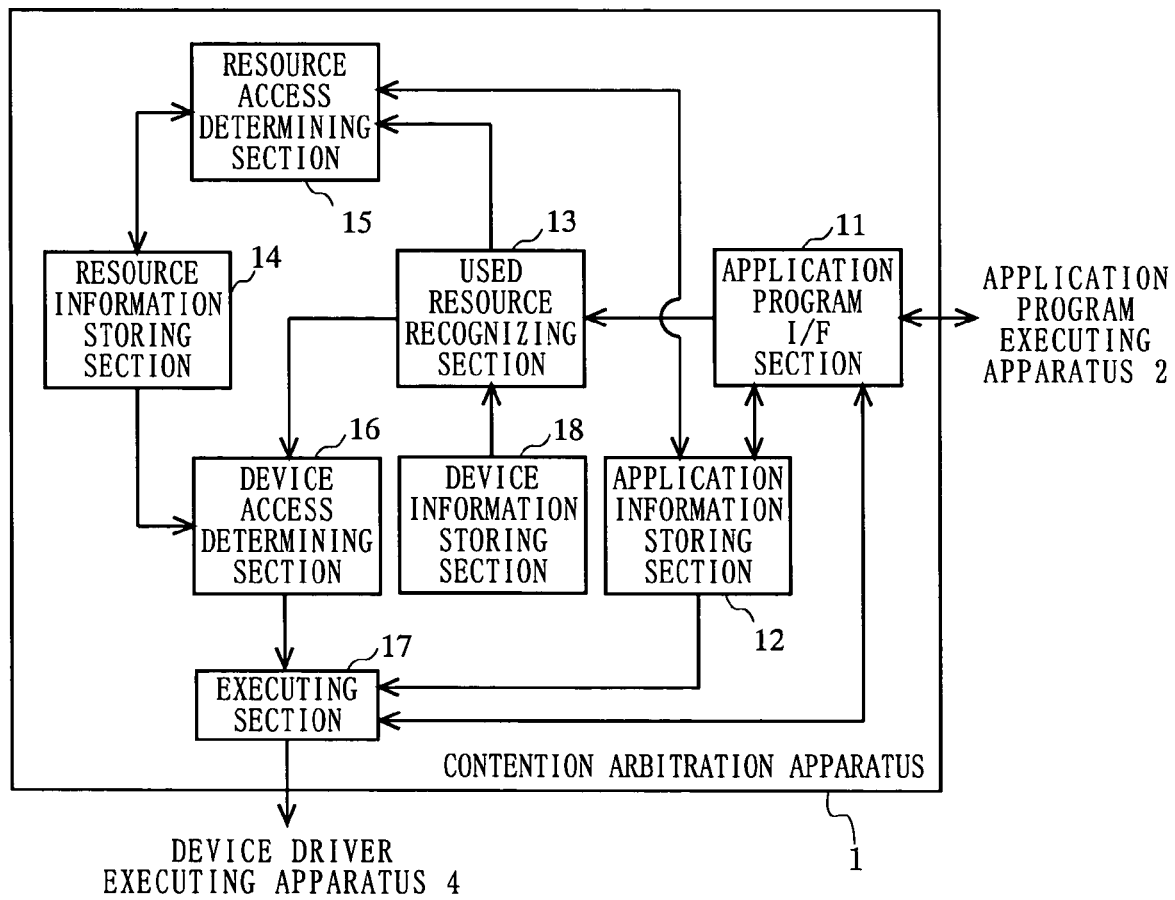

FIG. 6

| APPLICATION ID | PRIORITY | ACCESS TARGET LOGIC DEVICE NAME | ACCESSIBILITY INFORMATION |
|---|---|---|---|
| 1 | 1 | SDSP LOGIC DEVICE | ALLOWED |
| 2 | 2 | MIDI LOGIC DEVICE | NOT ALLOWED |
| 5 | 4 | LINE LOGIC DEVICE | ALLOWED |
| 3 | 3 | SDSP RECORDING LOGIC DEVICE | ALLOWED |
| 4 | 5 | SDSP REPRODUCING LOGIC DEVICE | NOT ALLOWED |
| ... | ... | ... | ... |

FIG. 7

| LOGIC DEVICE NAME | RESOURCE NAME |
|---|---|
| SDSP LOGIC DEVICE | SDSP RESOURCE |
| | LOUDSPEAKER RESOURCE |
| MIDI LOGIC DEVICE | MIDI RESOURCE |
| | LOUDSPEAKER RESOURCE |
| LINE LOGIC DEVICE | LINE RESOURCE |
| SDSP RECORDING LOGIC DEVICE | SDSP RECORDING RESOURCE |
| | SDSP CODEC RESOURCE |
| SDSP REPRODUCING LOGIC DEVICE | SDSP REPRODUCTION RESOURCE |
| | SDSP CODEC RESOURCE |
| ... | ... |

FIG. 8

| RESOURCE NAME | APPLICATION ID OF ACCESS RIGHT HOLDER |
|---|---|
| SDSP RESOURCE | 1 |
| LOUDSPEAKER RESOURCE | 1 |
| MIDI RESOURCE | NULL |
| LINE RESOURCE | 5 |
| LINE RESOURCE | NULL |
| LINE RESOURCE | NULL |
| SDSP CODEC RESOURCE | 3 |
| SDSP RECORDING RESOURCE | 3 |
| SDSP REPRODUCTION RESOURCE | NULL |
| ... | ... |

APPARATUS, METHOD AND PROGRAM FOR CONTENTION ARBITRATION

BACKGROUND OF THE INVENTION

1. Field of the Invention

The present invention relates to an apparatus and method for use in a computer system in which a plurality of application programs are executed, and more particularly to an apparatus and method for arbitrating a contention caused when the plurality of application programs simultaneously attempt to access an access target.

2. Description of the Background Art

In general, an application program executed in a computer system controls operations of a plurality of physical devices, such as loudspeakers, musical instruments digital interface (MIDI) devices, and sound digital signal processor (SDSP) devices, thereby controlling the operation of the entire computer system so as to perform a desired process. In a computer system in which a plurality of application programs are executed, however, when two or more application programs simultaneously access one physical device, a contention occurs between access requests. On the occurrence of the contention between access requests, that one physical device does not operate in a desired manner.

Hereinafter, the term "contention" refers to such a state as described above in which two or more application programs simultaneously attempt to access one physical device. When a contention occurs, application programs are not able to control the operation of the computer system in a desired manner. Accordingly, in the computer system in which the plurality of application programs are executed, it is necessary to control access requests from application programs to a physical device so as not to cause the occurrence of the contention. Hereinafter, the term "contention arbitration" refers to the control of access requests from application programs to a physical device. Conventionally, a variety of methods for contention arbitration have been proposed.

For example, there is a proposed method for content arbitration which uses exclusive control identifiers (see, for example, Japanese Patent Laid-Open Publication No. 2002-175287). In this method, the exclusive control identifiers are assigned to computing devices for executing application programs. When one application program accesses a shared physical device, a computing device, which executes the application program, collects exclusive control identifiers assigned to other computing devices. After collecting all the exclusive control identifiers, the computing device acquires exclusive control right to access the shared physical device.

There is another proposed method for content arbitration which arbitrates an access contention caused when a plurality of threads successively request to access data or object stored in a computer system (see, for example, Japanese Patent Laid-Open Publication No. 10-187527). In this method, the access contention is arbitrated based on a first-in, first-out process.

There is still another proposed method for content arbitration which uses a control device dedicated to contention arbitration in a computer system (see, for example, Japanese Patent Laid-Open Publication No. 2000-231458). In this method, the control device conducts the contention arbitration based on priorities assigned to access requests.

There is still another proposed method for content arbitration in which when a plurality of control commands are given to a device to be controlled, the device selects any one of the control commands based on a prescribed condition to arbitrate an access contention (see, for example, Japanese Patent Laid-Open Publication No. 2001-346276).

In the above-described conventional methods for contention arbitration, the contention arbitration is conducted for each physical device actually present in the computer system. Accordingly, in the case where the conventional methods are used for arbitrating an access contention, for example, in a physical device which can be simultaneously accessed by a plurality of application programs under a specific condition, or in a physical device which allows simultaneous accesses from a prescribed number of application programs, the advantages of such physical devices are not fully utilized.

Further, in the case where the above-described conventional methods are used for arbitrating an access contention in a physical device, such as a loudspeaker, which is connected to another physical device and does not have its own I/O port, when such a physical device is shared between a plurality of physical devices, an application program refers to a state transition table to determine not to access the physical device accessed by another application program, thereby avoiding the access contention. As a result, the contention arbitration depends on how the application program operates or how the physical devices are connected to each other. Further, an increase of the number of physical devices necessitates each application program to update the state transition table, making it difficult to conduct the contention arbitration.

As described above, the conventional methods for contention arbitration cannot fully utilize the advantages of physical devices, and cannot be flexibly adapted to a change of the physical devices.

SUMMARY OF THE INVENTION

Therefore, an object of the present invention is to provide a contention arbitration apparatus and method which can fully utilize the advantages of physical devices and can be flexibly adapted to a change of the physical devices.

The present invention has the following features to attain the object mentioned above.

A first aspect of the present invention is directed to a contention arbitration apparatus for arbitrating an access contention caused when a plurality of application programs simultaneously attempt to access at least one physical device. The contention arbitration apparatus includes: a resource information storing section for storing resource information which indicates a correspondence between at least one resource, which defines functions of said at least one physical device, and at least one application program, which is allowed to use functions associated with said at least one resource; a device information storing section for storing device information which indicates a correspondence between a logic device, which defines functions specified by said at least one application program which attempts to access said at least one physical device, and said at least one resource which defines functions required for implementing functions defined by the logic device; a used resource recognizing section for recognizing a resource associated with the logic device specified by said at least one application program by reference to the device information; a resource access determining section for determining by reference to the resource information which application program is allowed to access the resource recognized by the used resource recognizing section; and a device access determining section for determining, based on a determination result provided by the resource access determining section, whether the application program which has specified the logic device is able to access said at least one physical device which implements the functions defined by the logic device.

Preferably, the resource information may contain multiple access information which indicates whether to allow simultaneous accesses from a plurality of application programs, and when the simultaneous accesses from the plurality of application programs are allowed, the resource access determining section may allow the plurality of application programs to access the resource based on the multiple access information.

In this case, the resource access determining section may allow the plurality of application programs to access the resource only when a prescribed condition is satisfied.

For example, the prescribed condition may be that the plurality of application programs use the same scheme to implement a function provided by the resource.

Preferably, the contention arbitration apparatus may further include an executing section for executing a device driver for controlling said at least one physical device when the device access determining section determines that said at least one application program which has specified the logic device is allowed to access said at least one physical device.

For example, the executing section may send an error message to said at least one application program having specified the logic device when the access determining section determines that said at least one application is not allowed to access said at least one physical device.

Preferably, the resource access determining section may determine which application program is allowed to access said at least one physical device based on priorities of the plurality of application programs.

The contention arbitration apparatus may further include an application information storing section for storing information about the priorities of the plurality of application programs.

The resource information may contain additional information which indicates whether to grant an access right to an application program having provided an access indication first or last, and when the plurality of application programs have the same priorities, the resource access determining section may determine which one of the application programs is to be granted the access right based on the additional information.

Preferably, the contention arbitration apparatus may further include: an application information storing section for storing, as application information, a correspondence between a determination result obtained by the device access determining section and the plurality of application programs; and an executing section for executing a device driver for controlling said at least one physical device. When an access start indication is provided by an application program to specify the logic device, the device access determining section may determine whether the application program is able to access said at least one physical device and may store a determination result into the application information storing section. When an access indication is provided after the access start indication, the executing section may refer to the application information stored in the application information storing section to determine whether the application program is able to access said at least one physical device.

For example, when an access indication is provided by an application program which is not able to access said at least one physical device, the executing section may send an error message to the application program.

Further, when an access indication is provided by an application program, which is not allowed to access said at least one physical device since access to said at least one physical device is granted to another application program, the executing section may send an error message to the application program.

Preferably, upon receipt of an access termination indication from said at least one application program, the resource access determining section may grant an access right to another application program which attempts to use the functions associated with the resource, and may update the resource information such that a result of the grant of the access right is reflected in the resource information. The device access determining section may determine whether said another application program is able to access said at least one physical device based on the resource information updated by the resource access determining section.

Further, the contention arbitration apparatus may further include: an application information storing section for storing, as application information, a correspondence between a determination result obtained by the device access determining section and the plurality of application programs; and an executing section for updating the application information based on the determination result obtained by the device access determining section.

Alternatively, the contention arbitration apparatus may further include an executing section for changing a setting of a device driver when the device access determining section determines that said another application program is able to access said at least one physical device, the setting being changed such that said another application program is allowed to access the physical device.

Preferably, when only said at least one application program, which specifies the logic device, is allowed to use the functions associated with all the resources associated with the logic device, the device access determining section may determine that said at least one application program is allowed to use said at least one physical device.

Alternatively, when only said at least one application program, which specifies the logic device, is associated with a part of the resources associated with the logic device, the device access determining section may determine that said at least one application program is allowed to use functions defined by the part of the resources when accessing said at least one physical device.

Furthermore, the contention arbitration apparatus may further include an application I/F section for accepting specification of the logic device from said at least one application program.

For example, the resource information may contain additional information which indicates for each resource whether to grant an access right to an application program having provided an access indication first or last, and the resource access determining section may determine which application program is granted the access right based on the additional information.

A second aspect of the present invention is directed to a contention arbitration program for causing a computing apparatus to arbitrate an access contention caused when a plurality of application programs simultaneously attempt to access at least one physical device, the computing apparatus having stored therein resource information which indicates a correspondence between at least one resource, which defines functions of said at least one physical device, and at least one application program, which is allowed to use functions associated with said at least one resource, and also having stored therein device information which indicates a correspondence between a logic device, which defines functions specified by said at least one application program which attempts to access said at least one physical device, and said at least one resource which defines functions required for implementing functions defined by the logic device. The contention arbitration program causes the computing apparatus to perform a contention arbitration method comprising the steps of: recognizing a resource associated with the logic device specified by said at least one application program by reference to the device information; determining by reference to the resource information which application program is allowed to access the recognized resource; and determining, based on a determination result obtained by the step of determining by reference to the resource information, whether the application program which has specified the logic device is able to access said at least one physical device which implements the functions defined by the logic device.

A third aspect of the present invention is directed to a contention arbitration method for causing a computing apparatus to arbitrate an access contention caused when a plurality of application programs simultaneously attempt to access at least one physical device, the computing apparatus having stored therein resource information which indicates a correspondence between at least one resource, which defines functions of said at least one physical device, and at least one application program, which is allowed to use functions associated with said at least one resource, and also having stored therein device information which indicates a correspondence between a logic device, which defines functions specified by said at least one application program which attempts to access said at least one physical device, and said at least one resource which defines functions required for implementing functions defined by the logic device. The contention arbitration method include the steps of: recognizing a resource associated with the logic device specified by said at least one application program by reference to the device information; determining by reference to the resource information which application program is allowed to access the recognized resource; and determining, based on a determination result obtained by the step of determining by reference to the resource information, whether the application program which has specified the logic device is able to access said at least one physical device which implements the functions defined by the logic device.

The contention arbitration apparatus according to the first aspect manages logic devices specified by application programs, physical devices actually present in a system, resources for associating the logic devices with the physical devices, thereby managing functions of the physical devices and functions desired by application programs, and the contention apparatus according to the first aspect uses a method of arbitrating contention for access from the application programs to the physical devices for each resource. Thus, it is possible to provide a contention arbitration apparatus and method which can be flexibly adapted to a change of the physical devices only by changing the resource and device information stored in the contention arbitration apparatus. Further, the contention arbitration apparatus according to the first embodiment conducts the contention arbitration for each resource associated with the functions of the physical devices. Thus, it is possible to provide a contention arbitration apparatus and method which is capable of fully utilizing the advantages of the physical devices even if the physical devices have a variety of characteristics.

Further, in the case of granting simultaneous multiple accesses within a prescribed limit, or in the case of granting simultaneous multiple accesses when a prescribed condition is satisfied, the contention arbitration apparatus according to the first aspect is able to grant a plurality of application programs an access right to such a device. In this manner, the contention arbitration apparatus according to the first aspect is able to conduct contention arbitration so as to fully utilize the advantages of the physical devices.

Furthermore, the contention arbitration apparatus according to the first aspect is able to arbitrate contention of access to a physical device connected to other physical devices which does not have its own I/O port and is shared between a plurality of physical devices.

Further still, the contention apparatus according to the first aspect has a mechanism in which when an application program provides an access indication, if access is allowed, a device driver is executed, and if access is not allowed, an error message is returned to the application program. Accordingly, the application program is only required to handle errors caused when providing the access indication. Such a mechanism reduces application program developers burden in development of products.

Further still, the contention apparatus according to the first aspect conducts contention arbitration based on priorities assigned to application programs. In particular, when accessing a physical device which grants simultaneous multiple accesses, the application programs are allowed to the physical device in the decreasing order of priority. Thus, it is possible to realize complicated exclusive control based on the priorities.

Further still, whether the application programs are allowed to access the physical device is registered in the application information, and therefore it is not necessary to determine whether access is allowed each time an access indication is provided, leading to an increase in processing speed.

Further still, in the case where an access right to a physical device owned by an application program is taken by another application program having provided an access indication, if access to the physical device becomes available before the application program having previously owned the access right provides an access indication, no special process is required for allowing the application program to access the physical device without being notified that the access to the physical device has been temporarily unavailable.

Further still, in the case of using an application program which implements a desired function by simultaneously controlling a plurality of physical devices, it is necessary for the application program to be allowed to access to the plurality of physical devices in order to implement the desired function. As in the case of the contention arbitration apparatus according to the first aspect, if access rights are managed for each resource, it is possible to execute device drivers required for accessing all the plurality of physical devices, thereby implementing the desired function. Moreover, if even one physical device is unable to be accessed, the contention arbitration apparatus according to the present aspect notifies the application program of an error.

Further still, in the case where a part of desired functions can be implemented even if access to all the physical devices is not allowed, the contention arbitration apparatus according to the first embodiment is able to execute a device driver so as to allow the application program to partially implement the desired functions.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating the entire structure of a computer system including a contention arbitration apparatus according to an embodiment of the present invention;

FIG. 5 is a block diagram illustrating the functional configuration of a contention arbitration apparatus 1;

FIG. 6 is an exemplary table showing application information stored in an application information storing section 12;

FIG. 7 is an exemplary table showing device information;

FIG. 8 is an exemplary table showing resource information;

DESCRIPTION OF THE PREFERRED EMBODIMENTS

Figure 2:
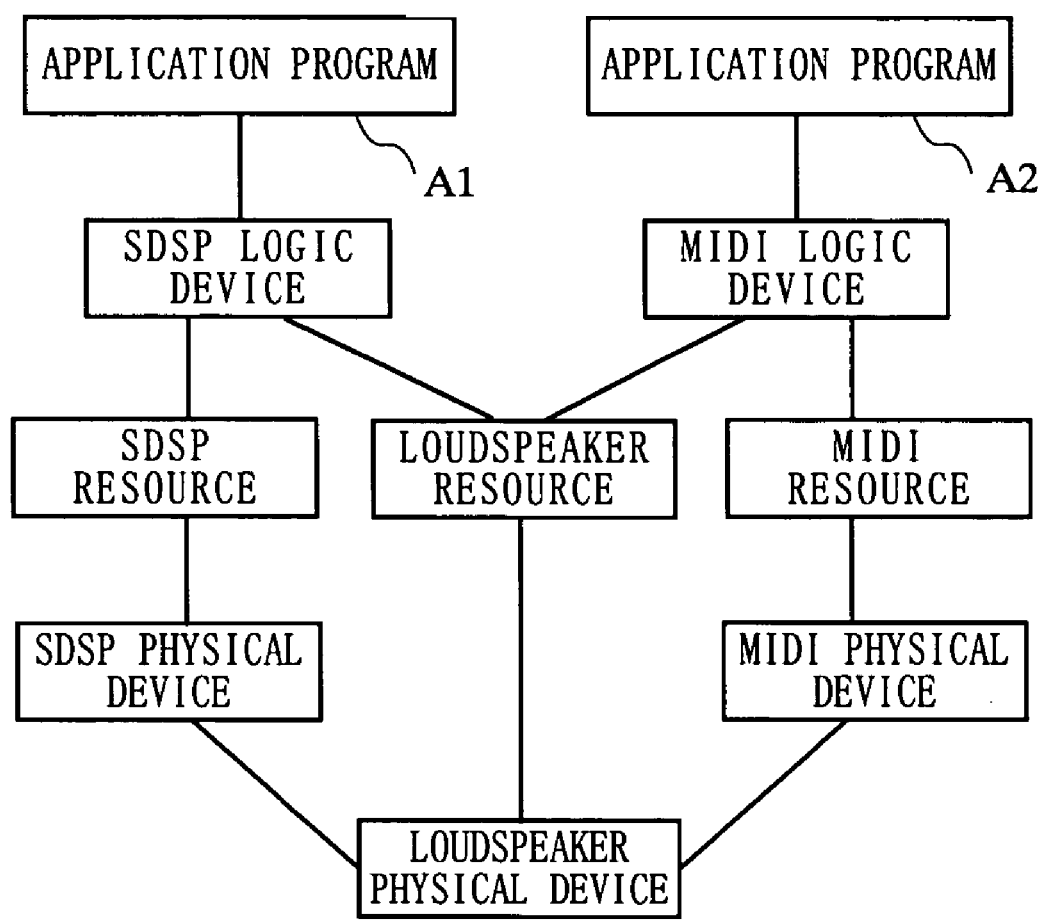
FIG. 2 is a schematic diagram illustrating an exemplary correspondence among application programs, logic devices, resources, and physical devices.

FIG. 1 is a block diagram illustrating the entire structure of a computer system including a contention arbitration apparatus according to an embodiment of the present invention. In FIG. 1, the computer system includes a contention arbitration apparatus 1, an application program executing apparatus 2, a plurality of physical devices 3, and a device driver executing apparatus 4. Although FIG. 1 shows only one application program executing apparatus 2 and only one device driver executing apparatus 4, a plurality of such apparatuses may be included in the system. Note that the number of the physical devices 3 is not limited to three, and a connection relationship between the physical devices 3 is not limited to a manner as shown in FIG. 1.

The computer system shown in FIG. 1 can be any device, e.g., a mobile communication terminal device such as a mobile phone, a mobile terminal device such as a PDA, or a communication terminal device such as a personal computer. Alternatively, the computer system shown in FIG. 1 can be any system using computing apparatuses, e.g., a LAN system in which a plurality of communication terminal devices are connected, or a home LAN system in which a plurality of digital household electrical appliances are connected.

The application program executing apparatus 2 is a computing device for executing application programs, and includes at least a central processing unit (CPU) and a storage device. The application executing apparatus 2 reads an application program from a memory, and the read application program is executed by the CPU. The application executing apparatus 2 has a multitask function of simultaneously executing a plurality of application programs.

Each physical device 3 is hardware, such as an input device, an output device, an auxiliary storage unit, or a communication device. Examples of the physical device 3 used as an input device include a button switch, a jog dial, a keyboard, a mouse, a joystick, and a microphone. Examples of the physical device 3 used as an output device include a loudspeaker, a liquid crystal display, a CRT display, a printer, an SDSP device, and a MIDI device. Note that the SDSP device is operable to decode digital data used in an application program, and to provide analog sound output. Examples of the physical device 3 used as an auxiliary storage unit include a hard disc drive, an optical disc drive, a CD-ROM drive, and a DVD-ROM drive. Examples of the physical device 3 used as a communication device include a modem, a digital service unit (DSU), and a LAN card.

The device driver executing apparatus 4 is a computing device for executing software for controlling the operation of each physical device 3 (hereinafter, such software is referred to as the "device driver"), and includes at least a CPU and a storage unit.

The contention arbitration apparatus 1 is operable to arbitrate an access contention caused when application programs executed by the application program executing apparatus 2 attempt to access desired physical devices 3. The contention arbitration apparatus 1 includes at least a CPU and a storage unit. When an application program indicates to the contention arbitration apparatus 1 that the application program wishes to start using the desired physical devices 3, the contention arbitration apparatus 1 conducts contention arbitration. Specifically, the contention arbitration apparatus 1 causes the device driver executing apparatus 4 to execute a device driver such that the application program is able to use the desired physical devices 3, thereby allowing the application program to use the desired physical device 3.

In the above description, although the contention arbitration apparatus 1, the application program executing apparatus 2, and device driver executing apparatus 4 are provided as separate devices, these apparatuses may be provided as separate software programs which share the same CPU and/or the same storage unit. Alternatively, the contention arbitration apparatus 1, the application program executing apparatus 2, and device driver executing apparatus 4 may be implemented in the form of hardware using a specialized LSI, or may be implemented in the form of software, e.g., specialized programs executed by the CPU.

Each physical device 3 has its own specific function. In the present embodiment, the contention arbitration apparatus 1 defines functions provided by the physical devices 3 as structures. Herein, such structures as viewed from the physical devices 3 are referred to as "resources". Each physical device 3 provides at least one or more functions, and therefore at least one or more resources are associated with one physical device 3.

Each application program controls the operation of a physical device 3, thereby implementing a desired function. As described above, the contention arbitration apparatus 1 defines functions desired by application programs as structures. Herein, such structures as viewed from the application programs are referred to as "logic devices". A function desired by an application program is implemented by the operation of at least one or more physical devices 3. A function of each physical device 3 is defined by at least one or more resources, and therefore the function desired by the application program is provided by one or more resources. That is, each logic device is associated with one or more resources.

The present invention introduces concepts of the logic devices and the resources, and the major feature of the present invention is to conduct contention arbitration using the logic devices and the resources.

When an application program attempts to electrically access a physical device 3 to implement a desired function, the application program specifies a logic device to the contention arbitration apparatus 1, and causes the contention arbitration apparatus 1 to conduct contention arbitration. The contention arbitration apparatus 1 manages for each resource whether the application program is able to access the physical device 3 is managed. The contention arbitration apparatus 1 recognizes a resource associated with the specified logic device, and determines whether the application program has an access right to the resource. If it has the access right, the contention arbitration apparatus 1 executes a device driver so as to enable the application program to access the physical device 3.

Figure 3:
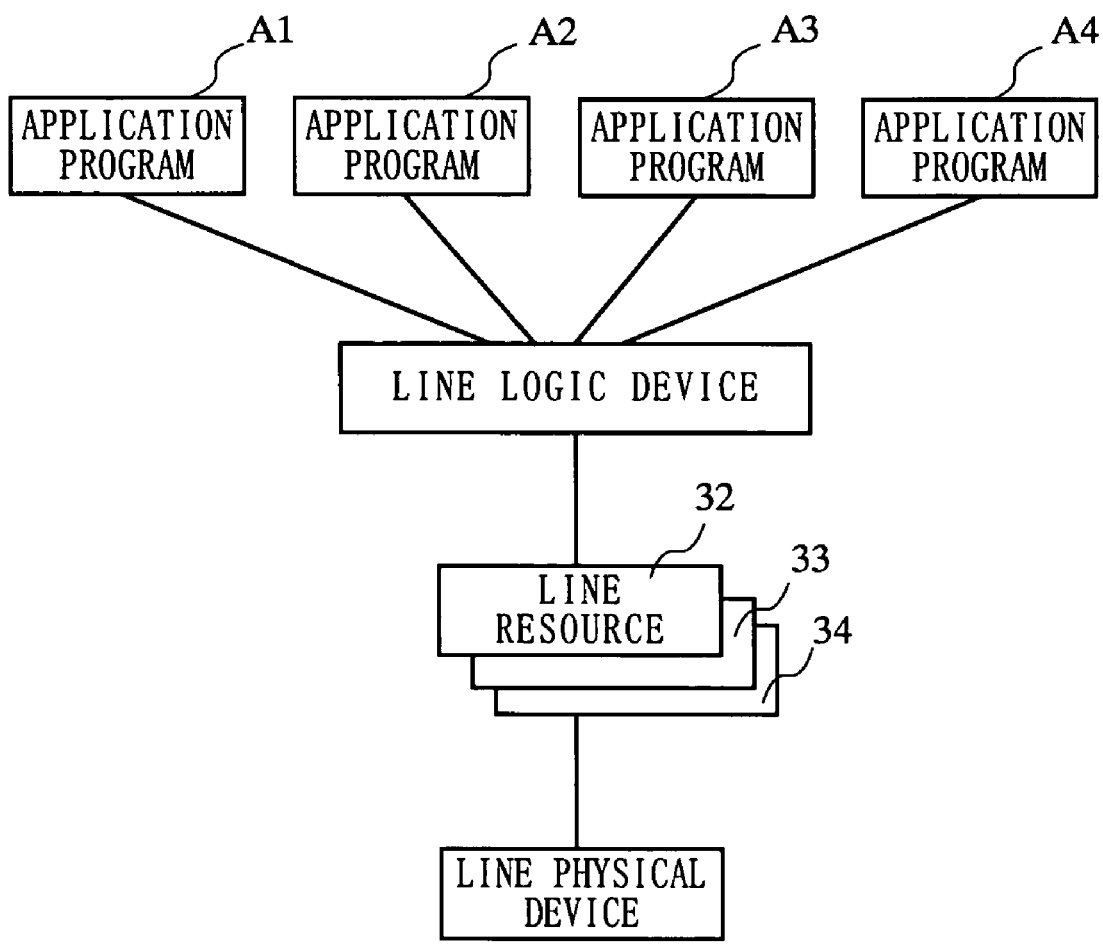
FIG. 3 is another schematic diagram illustrating an exemplary correspondence among application programs, logic devices, resources, and physical devices.
Figure 4:
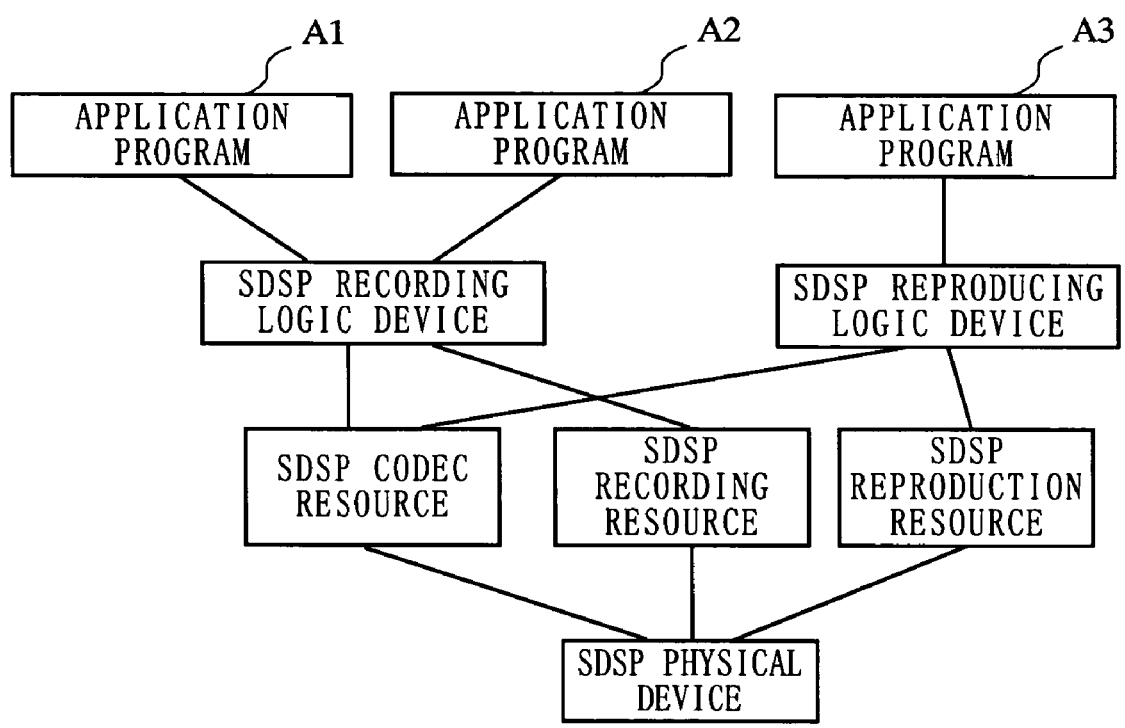
FIG. 4 is still another schematic diagram illustrating an exemplary correspondence among application programs, logic devices, resources, and physical devices.

FIGS. 2 through 4 are schematic diagrams each illustrating an exemplary correspondence among application programs, logic devices, resources, and physical devices. Hereinbelow, the general outline of the present embodiment will be described with reference to FIGS. 2 through 4.

FIG. 2 shows an example where an SDSP physical device, a loudspeaker physical device, and a MIDI physical device are used. In this example, the SDSP physical device is assumed not to grant simultaneous multiple accesses; the SDSP physical device and the MIDI physical device have an I/O port; and the loudspeaker physical device is connected to the SDSP physical device and the MIDI physical device, and has no I/O port.

Accordingly, an application program is not able to control only the loudspeaker physical device. Moreover, the loudspeaker physical device is shared between the SDSP physical device and the MIDI physical device, and therefore when an application program $A_1$ accesses the SDSP physical device, an application program $A_2$ is not able to access the MIDI physical device. The converse is also true.

When a plurality of application programs simultaneously attempt to access the SDSP physical device and the MIDI physical device, an access contention is caused with respect to the loudspeaker physical device invisible to the application programs. In order to prevent such an access contention, arbitration is conventionally required between the application programs. Accordingly, as the number of types of application programs or physical devices increases, the arbitration becomes hard to conduct. However, in the present invention, functions provided by physical devices are defined by resources, so that contention arbitration is conducted for each resource, and therefore it is not necessary to conduct arbitration between application programs, making it possible to readily conduct contention arbitration even if the number of types of application programs or physical devices is increased.

In FIG. 2, the SDSP physical device is associated with an SDSP resource; the loudspeaker physical device is associated with a loudspeaker resource; and the MIDI physical device is associated with a MIDI resource. An SDSP logic device which defines an SDSP function requires the SDSP resource and the loudspeaker resource. A MIDI logic device which defines a MIDI function requires the MIDI resource and the loudspeaker resource.

A condition for an application program to be allowed to access a logic device is that the application program has access rights to all the resources required by the logic device. In the present embodiment, an access right to each resource is provided based on the priority of the application program. Note that the access right maybe provided based on a first-in, first-out process or a last-in, first-out process.

In FIG. 2, assuming that the application $A_1$ attempts to access the SDSP logic device and the application $A_2$ attempts to access the MIDI logic device, even when the application $A_2$ has a higher priority than the application program $A_1$, the application program $A_1$ is able to obtain an access right to the SDSP resource since only the application $A_1$ attempts to access the SDSP resource. Similarly, the application program $A_2$ is able to obtain an access right to the MIDI resource since only the application $A_2$ attempts to access the MIDI resource.

However, in the above case, an access contention occurs between the application programs $A_1$ and $A_2$ since both logic devices to be accessed by the application programs $A_1$ and $A_2$ require the loudspeaker resource. In this case, the application program $A_2$ has a higher priority, and therefore the application program $A_2$ obtains an access right to the loudspeaker resource. As a result, the application program $A_2$ obtains access rights to all the resources required by the MIDI logic device targeted for access, and therefore the application program $A_2$ is allowed to access both the MIDI physical device and the loudspeaker physical device. Among resources required by the SDSP logic device targeted for access, the application program $A_1$ is not able to obtain an access right to the loudspeaker resource, and therefore the application program $A_1$ is not allowed to access the SDSP physical device and the loudspeaker physical device.

FIG. 3 shows an example where a line physical device is used. In this example, there is used only one physical device having a multi-call function of granting simultaneous multiple accesses such that three channels can be used simultaneously. In this case, although there are used only one line logic device and only one line physical device which are access targets of an application program, three line resources are defined. The line logic device requires at least one line resource.

In FIG. 3, for example, it is assumed that each of application programs $A_1$ through $A_4$ attempts to access the line physical device, and the application programs $A_1$, $A_2$, $A_3$, and $A_4$ are prioritized in this order. That is, the application program $A_1$ has the highest priority.

When the application program $A_1$ attempts to access the line logic device, the application program $A_1$ obtains an access right to one of three line resources (in this case, a first line resource 32). Then, when the application program $A_2$ attempts to access the line logic device, the application program $A_2$ obtains an access right to a second line resource 33. Thereafter, when the application program $A_4$ having the lowest priority attempts to access the line logic device, the application program $A_4$ obtains an access right to a third line resource 34.

In this case, when the application program $A_3$ having a higher priority than the application program $A_4$ attempts to access the line logic device, the contention arbitration apparatus 1 compares the priorities of the application programs $A_3$ and $A_4$. In this example, since the application program $A_3$ has a higher priority, the application program $A_3$ obtains an access right to the third line resource 34, while the application program $A_4$ is not allowed to access the third line resource 34. As a result, the application programs $A_1$ through $A_3$ are allowed to access the line logic device.

FIG. 4 shows an example where an SDSP physical device is used. In this example, the SDSP physical device is assumed to grant simultaneous multiple accesses. Note that the SDSP physical device shown in FIG. 2, which does not grant simultaneous multiple accesses, and the SDSP physical device shown in FIG. 4, which grants simultaneous multiple accesses, can coexist in the same computing apparatus. In FIG. 4, there is used only one physical device capable of activating recording and reproducing functions simultaneously. In this case, application programs target the SDSP recording logic device and the SDSP reproducing logic device for access. In FIG. 4, there are three resources, i.e., an SDSP codec (coder/decoder) resource which defines a codec function, an SDSP recording resource which defines a recording function, and an SDSP reproducing function which defines a reproducing function. The SDSP codec resource is able to simultaneously activate the recording and reproducing functions when the same codec scheme is used for both of the functions. The SDSP codec resource grants simultaneous multiple accesses based on codec information which indicates what codec scheme is used.

In this example, when a plurality of application programs attempt to access the SDSP physical device, the contention arbitration apparatus 1 sets a codec scheme of an application program having the highest priority as a default in the SDSP codec resource. In the case where a codec scheme of an application program having the lowest priority is identical to the codec scheme set as the default, the application program having the lowest priority is granted an access right to the SDSP codec resource by the contention arbitration apparatus 1.

In FIG. 4, for example, it is assumed that the application programs $A_1$ and $A_2$ attempt to access the SDSP recording logic device and the application program $A_3$ attempts to access the SDSP reproducing logic device. The application programs $A_1$, $A_2$, and $A_3$ are prioritized in this order. That is, the application program $A_1$ has the highest priority. Note that the application programs $A_1$, $A_2$, and $A_3$ use the same codec scheme X.

When the application program $A_1$ attempts to access the SDSP recording logic device, the application program $A_1$ obtains an access right to the SDSP codec resource, and sets the codec scheme X as a default in the SDSP resource. The application program $A_1$ also obtains an access right to the SDSP recording resource. Then, when the application program $A_2$ attempts to access the SDSP recording logic device, although the application program $A_2$ is able to obtain an access right to the SDSP codec resource since the application program $A_2$ uses the same codec scheme as that used by the application program $A_1$, an access contention with respect to the SDSP recording resource is caused between the application programs $A_1$ and $A_2$, and therefore the application program $A_2$ is not able to obtain an access right to the SDSP recording resource.

When the application program $A_3$ attempts to access the SDSP reproducing logic device, the application program $A_3$ is able to obtain an access right to the SDSP codec resource since the application program $A_3$ uses the same codec scheme as that used by the application program $A_1$ having a higher priority. Moreover, the application program $A_3$ is able to obtain an access right to the SDSP reproduction resource since there is no access contention with respect to the SDSP reproduction resource between the application programs $A_1$ and $A_3$.

Consequently, both the application programs $A_1$ and $A_3$ are allowed to access all the resources required by their respective access target logic devices, i.e., the SDSP recording and reproducing logic devices. Accordingly, the application programs $A_1$ and $A_3$ are allowed to access the SDSP recording logic device and the SDSP reproducing logic device, respectively. On the other hand, the application program $A_2$ is not able to obtain an access right to the SDSP recording resource, and therefore is not allowed to access the SDSP recording logic device.

FIG. 5 is a block diagram illustrating the functional configuration of the contention arbitration apparatus 1. In FIG. 5, the contention arbitration apparatus 1 includes: an application program interface (I/F) section 11; an application information storing section 12; a used resource recognizing section 13; a resource information storing section 14; a resource access determining section 15; a device access determining section 16; an executing section 17; and a device information storing section 18. All the functional parts shown in FIG. 5 may be collectively implemented as a program for operating a computing apparatus which includes a general-purpose CPU, or may be collectively implemented as a specialized LSI. Alternatively, each functional part may be implemented as a program executed by the general-purpose CPU or may be implemented by a specialized LSI. Alternatively still, a combination of a plurality of functional parts may be implemented in a manner as described above.

The application program I/F section 11 receives from an application program an indication that the application program attempts to start accessing a physical device (hereinafter, such an indication is referred to as the "access start indication"). The access start indication indicates the ID of the application program (hereinafter, referred to as the "application ID"), the name of a logic device desired by the application program (hereinafter, referred to as the "access target logic device name"); and the priority of the application program. The priority may be previously set for each application program, or may be set by an operating system (OS) to application programs as necessary. Alternatively, each application program may recognize the types of other application programs to set its own priority.

Upon receipt of the access start indication, the application program I/F section 11 stores the access target logic device name and the priority indicated by the access start indication into the application information storing section 12 so as to be associated with the application ID. Moreover, the application program I/F section 11 causes the used resource recognizing section 13 to recognize a resource used by the access target logic device specified by the access start indication.

Following the access start indication, the application program I/F section 11 receives from the application program an indication that the application program accesses the physical device (hereinafter, referred to as the "access indication"). The details of the access indication are the same as those of the above-described access start indication. Upon receipt of the access indication, the application program I/F section 11 notifies the executing section 17 of the details of the access indication, and receives from the executing section 17 information which indicates whether the application program is able to access the logic device. If the received information indicates that access is allowed, the application program I/F section 11 notifies the application program that the application program is allowed to access the logic device. On the other hand, if the received information indicates that access is denied, the application program I/F section 11 notifies the application program that the application program is not allowed to access the logic device.

Following the access indication, the application program I/F section 11 receives from the application program an indication that the application program terminates the access to the physical device (hereinafter, referred to as the "access termination indication"). Upon receipt of the access termination indication, the application program I/F section 11 instructs the used resource recognizing section 13 to cancel an access right granted to the application program.

The application information storing section 12 stores application information for each application program. The application information includes the priority of the application program, the access target logic device name, and information which indicates whether the application program is allowed to access the access target logic device (hereinafter, referred to as the "accessibility information").

FIG. 6 is an exemplary table showing the application information stored in the application information storing section 12. As shown in FIG. 6, the application information storing section 12 stores priorities, access target logic device names, and accessibility information so as to be associated with application IDs. For example, regarding the application program having application ID "1", the priority is 1, i.e., the highest, the access target logic device name is the "SDSP logic device", and the accessibility information indicates "ALLOWED". Note that the access target logic device name may be represented by the device ID of the access target logic device, and the accessibility information may be represented by a flag.

The device information storing section 18 holds device information which indicates relationships between logic devices and resources required by the logic devices. FIG. 7 is an exemplary table showing the device information. As shown in FIG. 7, in the device information, resource names are specified in association with logic device names. For example, the SDSP logic device is associated with the SDSP resource and the loudspeaker resource. One logic device may require one or more resources.

Upon being notified by the application I/F section 11 of the access start indication, the used resource recognizing section 13 refers to the device information stored in the device information storing section 18 and recognizes resources required by the access target logic device. The used resource recognizing section 13 notifies the resource access determining section 15 and the device access determining section 16 of the recognized resources, the application ID of an application program, which attempts to start to access the access target logic device, and priorities of the access target logic device and the application program. When one logic device requires a plurality of resources, the used resource recognizing section 13 may notify the resource access determining section 15 of the names of the plurality of resources simultaneously or separately.

The resource information storing section 14 stores resource information. The resource information is used for specifying for each resource an application having an access right to the resource. FIG. 8 is an exemplary table showing the resource information. As shown in FIG. 8, in the resource information, resource names are specified in association with application IDs of application programs having access rights to the resources. In FIG. 8, for example, the application ID of an application program having an access right to the SDSP resource is "1". Regarding each resource the access right to which is not assigned, "NULL" is registered in the "application ID" field. The resource information stored in the resource information storing section 14 is updated by the resource access determining section 15 when the resource access determining section 15 determines that there is a change of an application program having an access right to a resource.

When the used resource recognizing section 13 provides the resource access determining section 15 with a notification as described above, the resource access determining section 15 reads from the resource information storing section 14 resource information related to a resource name notified by the used resource recognizing section 13, and determines whether there is any application program having an access right to the resource. If there is such an application program, the resource access determining section 15 determines whether the application program has a higher priority than the priority of an application program having provided an access start indication, based on the application information stored in the application information storing section 12. As a result of such determination, if the holder of an access right to the resource is changed, the resource access determining section 15 updates the resource information stored in the resource information storing section 14.

Based on the resource name notified by the used resource recognizing section 13 and the resource information stored in the resource information storing section 14, the device access determining section 16 determines whether the application program having provided the access start indication has obtained access rights to all the resources used by the access target logic device. If the application program has obtained access rights to all the resources, the device access determining section 16 determines that the application program is able to access the access target logic device.

The executing section 17 receives from the device access determining section 16 information which indicates whether the application program is allowed to access the access target logic device. The executing section 17 updates, based on the received information, the accessibility information contained in the application program stored in the application information storing section 12. Further, upon being notified by the application I/F section 11 of an access indication, the executing section 17 refers to the application information stored in the application information storing section 12 to determine whether the application program is allowed to access the access target logic device. If access is allowed, the executing section 17 causes the device driver executing apparatus 4 to execute a device driver associated with the access target logic device, and sends to the application program I/F section 11 information which indicates that the access is allowed. On the other hand, if access is not allowed, the executing section 17 transmits to the application program I/F section 11 information which indicates that the access is not allowed.

Next, the operation of the contention arbitration apparatus 1 will be described in detail. First, in a computer system including the contention arbitration apparatus 1, when there is an application program which attempts to start accessing a physical device, the application program provides the contention arbitration apparatus 1 with an access start indication. When the application program actually attempt to access the physical device, the application program provides the contention arbitration apparatus 1 with an access indication. Lastly, when the application program attempts to terminate access to the physical device, the application program provides the contention arbitration apparatus 1 with an access termination indication.

Figure 9:
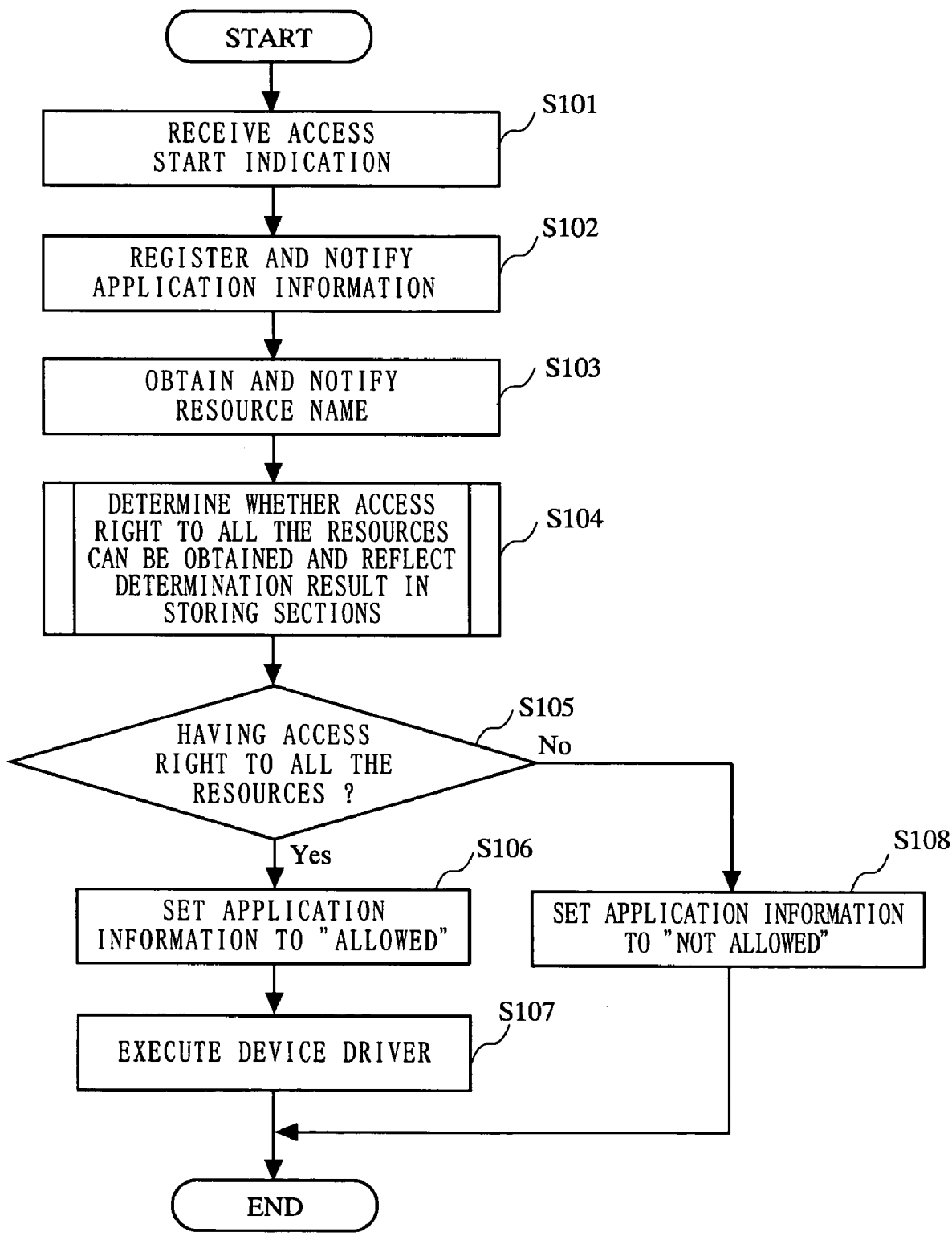
FIG. 9 is a flowchart illustrating the operation of the contention arbitration apparatus 1 when an access start indication is provided by an application program.

FIG. 9 is a flowchart illustrating the operation of the contention arbitration apparatus 1 when the access start indication is provided by an application program. Hereinbelow, the operation of the contention arbitration apparatus 1 when the access start indication is provided by an application program is described with reference to FIG. 9.

First, the application program I/F section 11 receives an access start indication from an application program (step S101). Hereinafter, the application program having provided the access start indication is referred to as the "application $AP_1$", and an access target logic device indicated by the access start indication is referred to as the "logic device $DEV_1$". Note that the access start indication also indicates the priority of the application $AP_1$.

Next, the application program I/F section 11 registers application information about the application $AP_1$ into the application information storing section 12 based on the received access start indication, and provides the used resource recognizing section 13 with the application ID, access target logic device name, and priority specified by the access start indication, thereby notifying the used resource recognizing section 13 of the occurrence of the access start indication (step S102). In this stage, accessibility information associated with the application $AP_1$ is not registered in the application information storing section 12.

Next, the used resource recognizing section 13 refers to device information stored in the device information storing section 18 to obtain a resource name associated with the access target logic device name provided by the application program I/F section 11, and then the used resource recognizing section 13 notifies the resource access determining section 15 and the device access determining section 16 of the obtained resource name (step S103). In this case, if there are a plurality of resources used by the access target logic device $DEV_1$, the used resource recognition section 13 notifies the resource access determining section 15 and the device access determining section 16 of all the resource names.

Next, the resource access determining section 15 refers to the resource information stored in the resource information storing section 14 and the application information stored in the application information storing section 12 to determine whether the application $AP_1$ is able to obtain access rights to all the resources notified by the used resource recognition section 13, and then the resource access determining section 15 reflects a determination result in the resource information and the application information (step S104). The details of step S104 will be described later.

Next, the device access determining section 16 refers to the resource information stored in the resource information storing section 14 to determine whether the application $AP_1$ has access rights to all the resources required by the access target logic device $DEV_1$ (step S105).

If it is determined that the application $AP_1$ has access rights to all the resources, the device access determining section 16 notifies the executing section 17 of a positive determination result. In accordance with the notified determination result, the executing section 17 updates the application information stored in the application information storing section 12 such that accessibility information related to the application $AP_1$ is set to "ALLOWED" (step S106). Then, the executing section 17 causes the device driver executing apparatus 4 to execute a device driver associated with the access target logic device $DEV_1$ (step S107), thereby terminating the procedure.

On the other hand, if it is determined at the above step S105 that the application $AP_1$ does not have access rights to all the resources, the device access determining section 16 notifies the executing section 17 of a negative determination result. In accordance with the notified determination result, the executing section 17 updates the application information stored in the application information storing section 12 such that the accessibility information related to the application $AP_1$ is set to "NOT ALLOWED" (step S108), thereby terminating the procedure.

Figure 10:
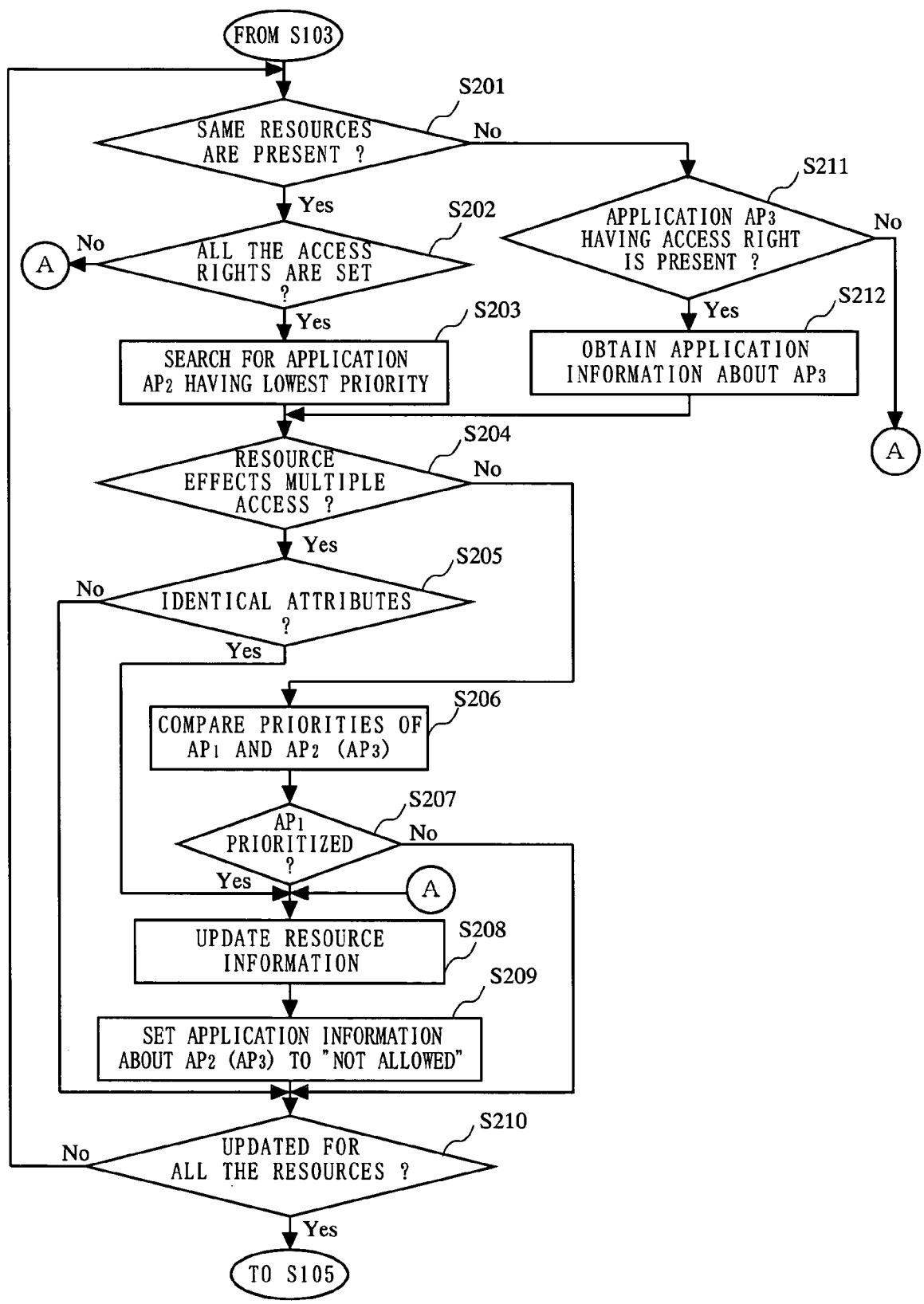
FIG. 10 is a flowchart illustrating the detailed operation of a resource access determining section 15 performed at step S104 of FIG. 9.

FIG. 10 is a flowchart illustrating the detailed operation of the resource access determining section 15 performed at step S104 of FIG. 9. Hereinbelow, the detailed operation of the resource access determining section 15 performed at step S104 of FIG. 9 is described with reference to FIG. 10.

First, the resource access determining section 15 refers to the resource information stored in the resource information storing section 14 to determine whether a plurality of resources having the same name are used by the access target logic device $DEV_1$ (step S201). As can be seen from FIG. 8, resources having the same name, e.g., line resources, can be specified in the resource information.

If there are a plurality of resources having the same name, the resource access determining section 15 determines whether access rights to all the resources having the same name is granted to any application programs (step S202). If access rights to all the resources is granted, the resource access determining section 15 refers to the application information stored in the application information storing section 12 to search from among application programs having access rights to the resources for an application program having the lowest priority (step S203), and then the procedure proceeds to step S204. Here, the application program having the lowest priority is referred to as "application $AP_2$". If access rights to all the resources is not granted, the procedure proceeds to step S208.

At step S204, the resource access determining section 15 determines whether the resources having the same name grant simultaneous multiple accesses, i.e., whether a resource, which grants simultaneous multiple accesses, is indicated as the plurality of resources having the same name. Herein, the resource, which grants simultaneous multiple accesses, means a resource which allows application programs satisfying a prescribed condition to simultaneously access the resource. Note that multiple access information contained in the resource information indicates whether the resource grants the simultaneous multiple accesses (the multiple access information is not shown in FIG. 8 which illustrates an example of the resource information).

If the resources do not grant the simultaneous multiple accesses, the procedure proceeds to step S206. On the other hand, if the resources grant the simultaneous multiple accesses, the resource access determining section 15 determines whether the attribute of the application $AP_1$ which attempts to access the resources is identical to the attribute of the resources (step S205).

The term "attribute" as described herein refers to information which indicates a condition as to how the resource is used by an application program. For example, the attribute is information which indicates what codec scheme is used for the SDSP codec resource. The attribute is provided by the application program together with the access start indication. If the attributes are identical to each other, the procedure proceeds to step S208 where the resource access determining section 15 updates the resource information so as to allow the applications $AP_1$ and $AP_2$ to be granted access rights to the resources. On the other hand, if the attributes are not identical, the procedure proceeds to step S210. As described above, in the present embodiment, when satisfying a prescribed condition that all the application programs having provided the access start indication have a common attribute, the resource access determination section 15 updates the resource information so as to grant simultaneous multiple accesses.

Note that in the case where the multiple access limits the number of application programs which are allowed to access the resource, the resource access determining section 15 determines at step S205 whether the number of application programs exceeds an upper limit, and only when the upper limit is not exceeded, the procedure proceeds to step S208. If the upper limit is exceeded, the procedure proceeds to step S206 where the priorities are compared between the application program having the lowest priority and the application $AP_1$ in order to grant an access right to an application program having a higher priority.

Specifically, at step S206, the resource access determining section 15 compares the priorities of the applications $AP_1$ and $AP_2$, and determines based on a comparison result whether the application $AP_1$ has a higher priority (step S207). If the application $AP_1$ has a higher priority, the procedure proceeds to step S208 where the resource access determining section 15 updates the resource information such that the access right is granted to the application $Ap_1$ having a higher priority. Thereafter, the resource access determining section 15 updates the application information stored in the application information storing section 12 such that accessibility information related to the application $AP_2$ is set to "NOT ALLOWED" (step S209), and the procedure proceeds to step S210. On the other hand, if it is determined at the above step S207 that the application $AP_1$ has a lower priority, the procedure proceeds to step S210.

Referring back to step S201, if there are no resources having the same name, i.e., when the access target logic device $DEV_1$ uses only one resource or when the access target logic device $DEV_1$ uses a plurality of resources of different types, the resource access determining section 15 determines whether there is any application program having an access right to the resource or any one of the resources of different types (step S211). Here, such an application program having an access right to the resource or any one of the resources of different types is referred to as "application $AP_3$".

At step S211, if there is no application program having an access right to the resource(s), the procedure proceeds to step S208 where the resource access determination section 15 updates the resource information such that the application $AP_1$ is granted an access right to the resource(s). On the other hand, if it is determined that there is an application program having the access right to the resource(s), the resource access determining section 15 refers to the application information stored in the application information storing section 12 to obtain application information related to the application program having the access right to the resource(s) (step S212), and the procedure proceeds to step S204.

The resource access determining section 15 determines at step S210 whether the resource information and the application information have been updated with respect to all the resources used by the access target logic device $DEV_1$ (step S210). If not, the procedure returns to step S201. In this case, the resource access determining section 15 does not perform determination of step S201 and subsequent steps with respect to the resources on which determination has been performed. On the other hand, if updating has been completed, the procedure proceeds to step 105 and beyond.

Figure 11:
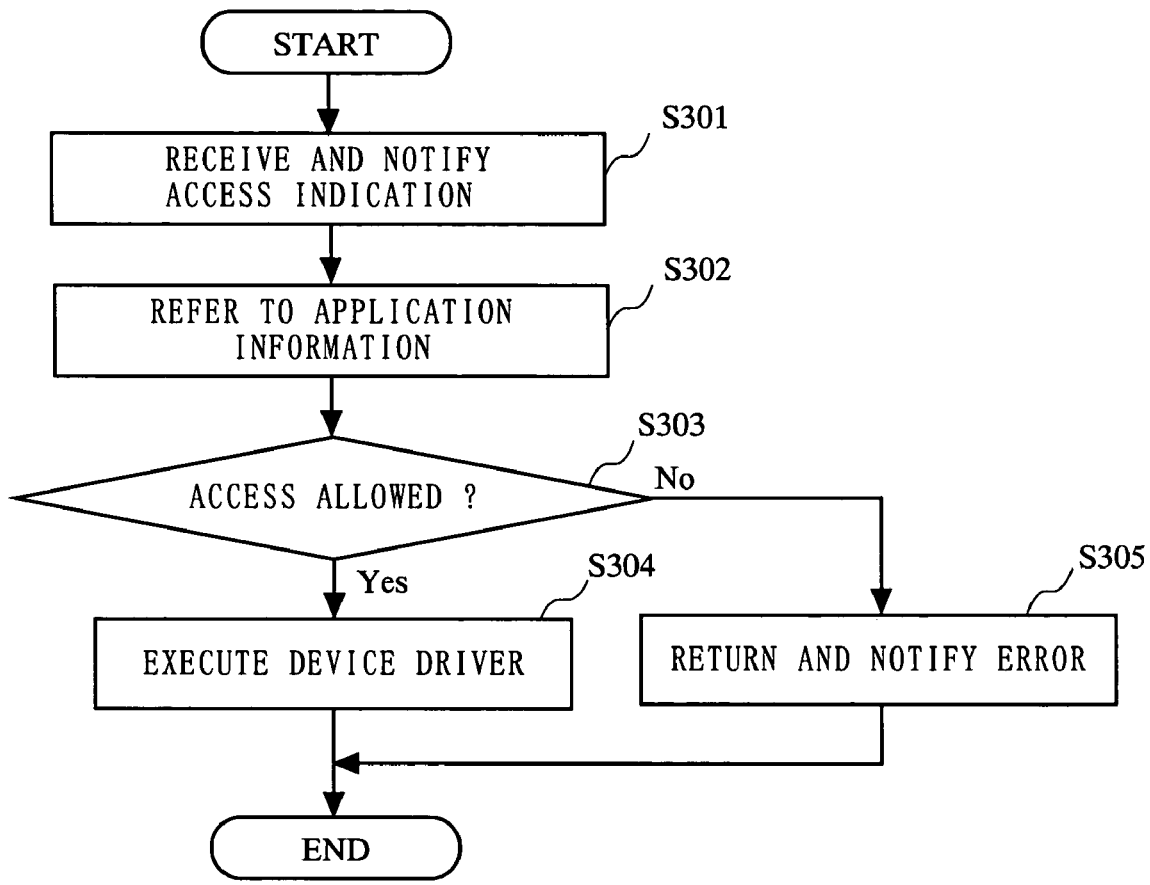
FIG. 11 is a flowchart illustrating the operation of the contention arbitration apparatus 1 when an access indication is provided by an application program.

FIG. 11 is a flowchart illustrating the operation of the contention arbitration apparatus 1 when the access indication is provided by an application program. Hereinbelow, the operation of the contention arbitration apparatus 1 when the access indication is provided by an application program is described with reference to FIG. 11.

The application $AP_1$ provides an access start indication before providing an access indication. When the access indication is provided, accessibility information, which indicates whether the application $AP_1$ is allowed to access the access target logic device $DEV_1$, is registered into the application information storing section 12 in a manner as described above. In the operation of the contention arbitration apparatus 1 when the access indication is provided, the following procedure is carried out by reference to application information which is set when the access start indication is provided.

First, the application I/F section 11 receives an access indication from the application $AP_1$, and notifies the executing section 17 of the occurrence of the access indication (step S301). Then, the executing section 17 refers to the application information stored in the application information storing section 12 (step S302).

Next, the executing section 17 determines whether the application $AP_1$ having provided the access indication is allowed to access the access target logic device $DEV_1$, based on accessibility information related to the application $AP_1$ (step S303).

If access to the access target logic device $DEV_1$ is allowed, the executing section 17 causes the device driver executing section 17 to execute a device driver associated with the access target logic device $DEV_1$ (step S304), thereby terminating the procedure.

On the other hand, if access to the access target logic device $DEV_1$ is not allowed, the executing section 17 sends to the application I/F section 11 an error message which indicates that access is not allowed. Upon receipt of the error message, the application I/F section 11 notifies the application $AP_1$ that access to the access target logic device $DEV_1$ is not allowed (step S305), thereby terminating the procedure.

Figure 12:
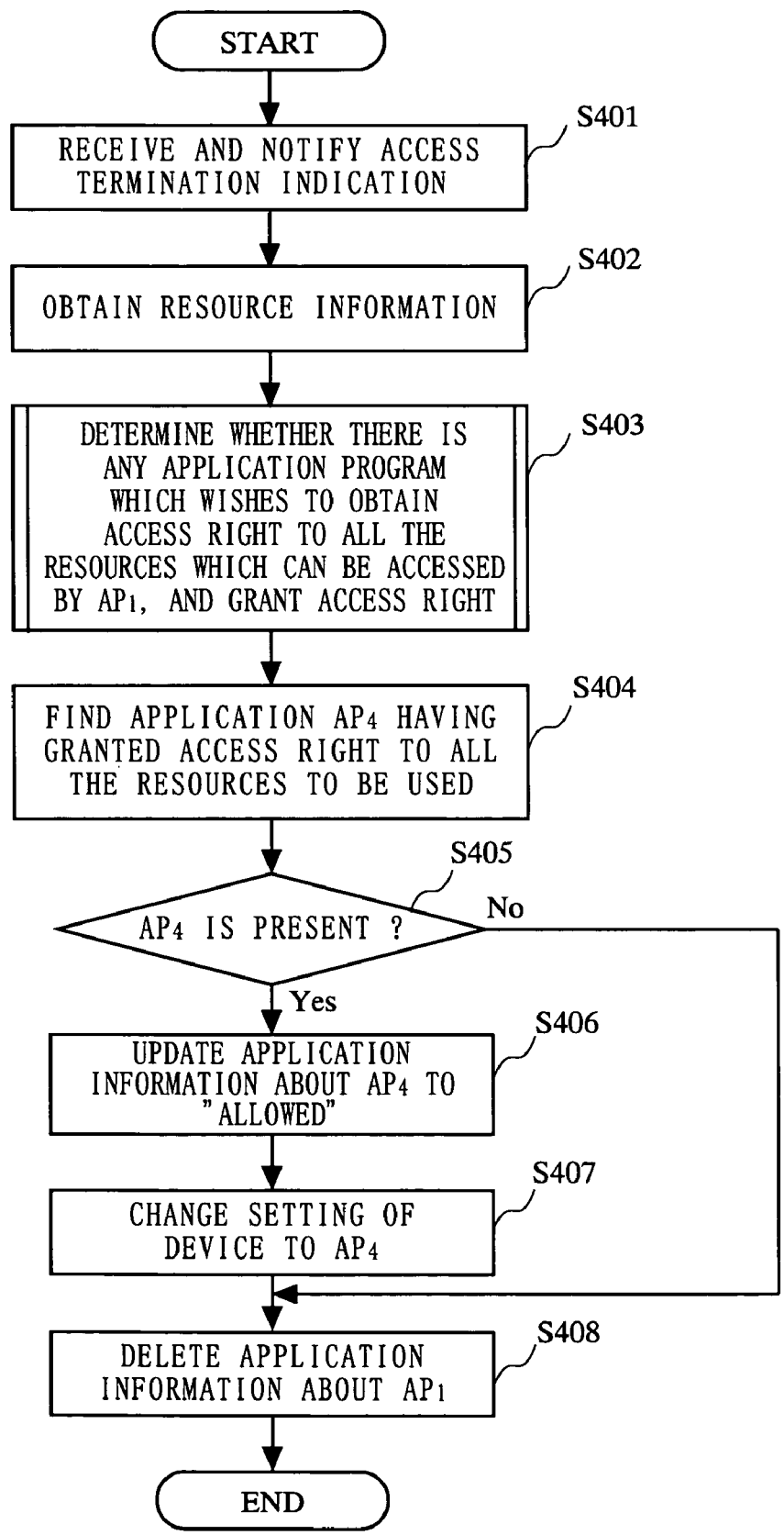
FIG. 12 is a flowchart illustrating the operation of the contention arbitration apparatus 1 when an access termination indication is provided by an application program.

FIG. 12 is a flowchart illustrating the operation of the contention arbitration apparatus 1 when the access termination indication is provided by an application program. Hereinbelow, the operation of the contention arbitration apparatus 1 when the access termination indication is provide by an application program is described with reference to FIG. 12.

First, the application I/F section 11 receives an access termination indication from the application $AP_1$, and notifies the used resource recognizing section 13 of the occurrence of the access termination indication by transmitting information indicating the application ID of the application $AP_1$, the access target logic device name, and the priority of the application $AP_1$ (step S401).

Upon being notified of the occurrence of the access termination indication, the used resource recognizing section 13 refers to the device information stored in the device information storing section 18 to obtain names of resources required by the access target logic device $DEV_1$, and notifies the resource access determining section 15 of the obtained resource names. Upon being notified of the resource names, the resource access determining section 15 obtains from the resource information storing section 14 resource information related to the resources required by the access target logic device $DEV_1$ (step S402).

Next, the resource access determining section 15 refers to the device information stored in the device information storing section 18 to recognize logic devices which use resources indicated by the resource information obtained at the above step S402, and then the resource access determining section 15 refers to the application information stored in the application information storing section 12 to recognize application programs which have provided an access start indication and are specified as "NOT ALLOWED" by the accessibility information. This allows the resource access determining section 15 to determine whether there is any application program, other than the application $AP_1$, which has provided an access start indication and has been granted an access right. If there is an application program which has not been granted an access right, the resource access determining section 15 rewrites the resource information stored in the resource information storing section 14 such that an access right is granted to such an application program (step S403). The detailed process performed at step S403 will be described later.

Next, the resource access determining section 15 refers to the application information stored in the application information storing section 12 to recognize the access target logic device of the application program having granted an access right at step S403, the resource access determining section 15 further refers to the device information stored in the device information storing section 18 to recognize all the resources used by the access target logic device, and thereafter the resource access determining section 15 refers to the resource information stored in the resource information storing section 14 to determine whether access rights to all the resources is granted to any application program. This allows the resource access determining section 15 to find an application program having access rights to all the resources used by the access target logic device (step S404). Hereinafter, the application program found at step S404 is referred to as the "application $AP_4$".

Next, the resource access determining section 15 determines based on a search result obtained at step S404 whether there is any application $AP_4$ (step S405). If there is no application $AP_4$, the procedure proceeds to step S408, where the resource access determining section 15 deletes from the application information storing section 12 application information related to the application $AP_1$ having provided the access termination indication, thereby terminating the procedure.

On the other hand, if there is any application $AP_4$, the resource access determining section 15 updates the application information stored in the application information storing section 12 such that accessibility information related to the application $AP_4$ is set to "ALLOWED" (step S406). Then, the executing section 17 changes the setting of a device driver associated with the access target logic device such that the application $AP_4$ is able to use the access target logic device (step S407), and the procedure proceeds to step S408, thereby terminating the procedure.

Note that the above step S407 is performed only when the device driver has a function of maintaining settings related to application programs having an access right. If the device driver does not have such a function, when the application $AP_4$ provides an access indication, the executing section 17 may return to the application $AP_4$ an error code which indicates that a device setting is required. Alternatively, if the device driver has the above function, the device driver may automatically make the device setting.

Figure 13:
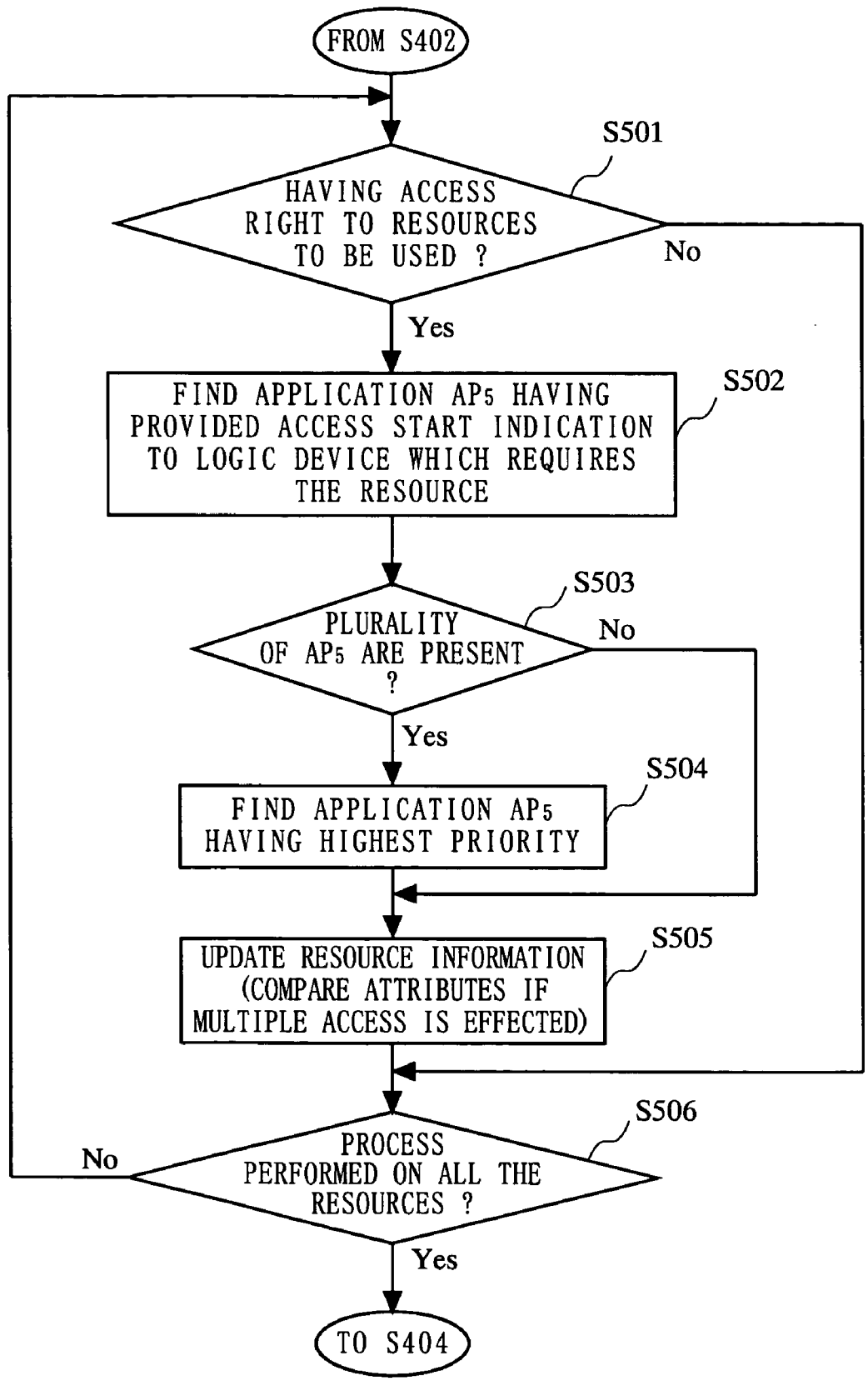
FIG. 13 is a flowchart illustrating the detailed operation of the resource access determining section 15 performed at step S403 of FIG. 12.

FIG. 13 is a flowchart illustrating the detailed operation of the resource access determining section 15 performed at step S403 of FIG. 12. Hereinafter, the detailed process of the above step S403 performed by the resource access determining section 15 will be described with reference to FIG. 13.

First, the resource access determining section 15 refers to the application information stored in the application information storing section 12 to recognize an access target logic device of the application $AP_1$, and then refers to the device information stored in the device information stored in the device information storing section 18 to recognize all the resources required by the access target logic device. Further, the resource access determining section 15 refers to the resource information stored in the resource information storing section 14 to determine whether the application $AP_1$ has an access right to any one of the recognized resources (step S501).

If the application $AP_1$ has an access right to any resource, the resource access determining section 15 refers to the device information stored in the device information storing section 18 to recognize logic devices which require the resource, and then refers to the application information stored in the application information storing section 12 to find an application program having provided an access start indication with respect to the logic device (step S502). Hereinafter, the application program found at step S502 is referred to as the "application $AP_5$".

Next, the resource access determining section 15 determines whether a plurality of applications $AP_5$ have been found at step S502. If there are a plurality of applications $AP_5$, the resource access determining section 15 refers to the application information stored in the application information storing section 12 to search from among the plurality of application $AP_5$ for the one having the highest priority (step S S504), and the procedure proceeds to step S505. If it is determined at step S503 that only one application $AP_5$ has been found at the above step S502, the procedure proceeds to step S505 by skipping step S504.

At step S505, the resource access determining section 15 updates the resource information stored in the resource information storing section 14 such that the application $AP_5$ is granted an access right, and the procedure proceeds to step S506. In this case, when there is no application $AP_5$ which requires a resource which can be accessed by the application $AP_1$, the resource access determining section 15 updates the resource information so as to set "NULL" in the field related to the resource. If the resource information related to a resource, which grants simultaneous multiple accesses, is updated, the resource access determining section 15 sets resource attribute anew. Then, the resource access determining section 15 compares the set resource attribute with the attribute of the resource used by the application program(s) found at the above step S502. If it is determined that the attributes are identical to each other, the resource access determining section 15 grants an access right to the application program(s). Note that when the number of access rights which can be granted is limited, the resource access determining section 15 grants the access right to the application programs in a decreasing order of priority.

At step S506, the resource access determining section 15 determines whether the process of the above step S505 has been performed on all the resources required by the logic devices targeted for access by the application $AP_1$ (step S506). If the process has not been performed on all the resources, the procedures returns to step S501. On the other hand, if the process has been performed on all the resources, the procedure proceeds to step S404.

As described above with reference to FIGS. 12 and 13, when the application $AP_1$ terminates an access to the logic device $DEV_1$, the contention arbitration apparatus 1 automatically grants an access right to the logic device $DEV_1$ to an application program which has not been allowed to access the logic device $DEV_1$ due to resource contention.

The above processes described with reference to FIGS. 12 and 13 are characterized in that a logic device (e.g., $DEV_2$) other than the logic device $DEV_1$ to which an access termination indication is provided is granted an access right. Consider an exemplary case where the application $AP_2$ provides an access start indication to the access target logic device $DEV_2$ and also provides an access start indication to the access target logic device $DEV_1$ before the application $AP_2$ does not even start accessing the logic device $DEV_1$. In this case, it is assumed that both the logic devices $DEV_1$ and $DEV_2$ require a resource R.

First, when the application $AP_2$ provides an access start indication to the logic device $DEV_2$, no access contention with respect to the resource R is caused, and therefore the application $AP_2$ is able to access the logic device $DEV_2$. Thereafter, if the application $AP_1$ provides an access start indication to the logic device $DEV_1$, the application $AP_1$ is granted an access right to the resource R since the application $AP_1$ has a higher priority than the application $AP_2$. As a result, the application $AP_2$ is not allowed to access the logic device $DEV_2$.

The application $AP_2$ has provided the access start indication but has not provided an access indication to the logic device $DEV_1$. Thus, it is not known to the application $AP_2$ that the application $AP_2$ is not allowed to access the logic device $DEV_2$.

In the above case, when the application $AP_1$ accesses the logic device $DEV_1$ to perform necessary processes and provides an access termination indication, the resource R is released from the application $AP_1$. Accordingly, the logic device $DEV_2$ is allowed to access the device $DEV_2$ after the processes described with reference to FIGS. 12 and 13 automatically performed (see steps S404 through S406). That is, the application $AP_2$ accesses the logic device $DEV_2$ without being notified that access to the logic device $DEV_2$ is not allowed during a period from providing the access start indication to accessing the logic device $DEV_2$. By providing the above-described processes, it is made possible to simplify an application's function used for accessing a physical device.

Next, the flow of processes described with reference to FIGS. 9 through 13 are specifically described in conjunction with correspondence among the application programs, the logic devices, the resources, and the physical devices which are illustrated in FIGS. 2 through 4.

Referring to FIG. 2, for example, consider a case where the application $A_2$ provides an access start indication to the MIDI logic device when the application $A_1$ is allowed to access the SDSP logic device. In this case, the application $A_2$ has a higher priority than the application program $A_1$.

First, the contention arbitration apparatus 1 obtains resource information related to the MIDI and loudspeaker resources required by the application $A_2$. There are no other resources having the same names as the MIDI and loudspeaker resources, i.e., there are only one MIDI resource and only one loudspeaker resource. Accordingly, the contention arbitration apparatus 1 determines whether there is any application program which already have granted access rights to these resources (see step S211 of FIG. 10). In this case, an access right to the loudspeaker resource has already been granted to the application $A_1$, and therefore the contention arbitration apparatus 1 compares the priorities of the application programs $A_1$ and $A_2$ (see step S206 of FIG. 10). Since the application program $A_2$ has a higher priority than the application program $A_1$, the application program $A_2$ is granted access rights to the MIDI and loudspeaker resources, and therefore is able to access the MIDI logic device (see step S208 of FIG. 10).

On the other hand, the application program $A_1$ is not allowed to access the loudspeaker resource, and therefore is not allowed to access the SDSP logic device (step S209 of FIG. 10).

Application information related to the application $A_1$ is set to "NOT ALLOWED", and therefore when the application program $A_1$ provides an access indication to the SDSP logic device, the contention arbitration apparatus 1 returns an error message to the application program $A_1$ (see step S305 of FIG. 11), thereby notifying the application $A_1$ that access to the SSP logic device is not allowed.

Next, consider a case where the application program $A_2$ provides an access termination indication before the application program $A_1$ provides the access indication. First, the contention arbitration apparatus 1 obtains resource information related to resources (the MIDI and loudspeaker resources) which can be accessed by the application program $A_2$. Then, the contention arbitration apparatus 1 determines whether there is any application program which requires an access right to any one of the resources. In this example, there is no application program which requires an access right to the MIDI resource, and therefore the contention arbitration apparatus 1 updates the resource information such that "NULL" is set in the field related to the MIDI resource. On the other hand, an access right to the loudspeaker resource is required by the application program $A_1$, and therefore the contention arbitration apparatus 1 updates the resource information such that the access right to the loudspeaker resource is granted to the application program $A_1$ (see step S403 of FIG. 12).

If there is any application program other than the application program $A_1$ which requires the loudspeaker resource, the contention arbitration apparatus 1 compares the priorities of the application program $A_1$ and that application program which requires the loudspeaker resource, and grants the access right to the one having a higher priority.

The application program $A_1$ has obtained the access right to the loudspeaker resource, and therefore is able to access all the necessary resources. Thus, the application program $A_1$ is enabled to access the SDSP logic device. The contention arbitration apparatus 1 updates the application information related to the application program $A_1$ so as to indicate that the application program $A_1$ is allowed to access the SDSP logic device (see step S406 of FIG. 12).

In the case where the SDSP device driver has a function of restoring the setting of the application $A_1$, when the application program $A_1$ provides an access indication, the application program $A_1$ is allowed to access the SDSP logic device without being notified that access to the SDSP logic device was not allowed during a period from providing the access start indication to accessing the SDSP logic device. Specifically, the application program $A_1$ is allowed to access the SDSP physical device and the loudspeaker physical device.

Next, the flow of processes described with reference to FIGS. 9 through 13 are specifically described in conjunction with correspondence among the application programs, the logic device, the resources, and the physical device which are illustrated in FIG. 3. In FIG. 3, it is assumed that the application programs $A_1$, $A_2$, and $A_4$ have already been allowed to access the line logic device, for example. Now, consider a case where the application program $A_3$ provides an access start indication to the line logic device. In this case, the application programs $A_1$, $A_2$, $A_3$, and $A_4$ are prioritized in this order. That is, the application program $A_1$ has the highest priority.

First, the contention arbitration apparatus 1 determines a line resource, access to which has not been granted to any application program, from among three line resources 32 through 34 (see step S202 of FIG. 10). In this example, it is assumed that the application programs $A_1$, $A_2$, and $A_4$ have obtained access rights to the line resources 32 through 34. Accordingly, there is no line resource access to which has not been granted to any application program, i.e., there is no resource left available to the application program $A_3$.

Next, the contention arbitration apparatus 1 recognizes an application program having the lowest priority from among the application programs $A_1$, $A_2$, and $A_4$ (see step S203 of FIG. 10). In this example, it is assumed that the application program $A_4$ has the lowest priority. Accordingly, the contention arbitration apparatus 1 compares the priorities of the application programs $A_3$ and $A_4$ (see step S206 of FIG. 10). In this example, it is assumed that the application program $A_3$ has a higher priority than the application program $A_4$, and therefore the contention arbitration apparatus 1 makes a setting so as to allow the application program $A_3$ to be granted the access right to the line resource, access to which has been granted to the application $A_4$, thereby enabling the application program $A_3$ to access the line logic device (see step S208 of FIG. 10). On the other hand, the application program $A_4$ is disabled from accessing the line logic device (step S209 of FIG. 10).

Next, consider a case where an application program $A_5$ (not shown) having a lower priority than the application program $A_4$ provides an access start indication. In this case, all the line resources have already been occupied. The contention arbitration apparatus 1 recognizes an application program having the lowest priority from among the application programs $A_1$ through $A_3$ (see step S203 of FIG. 10). Among these application programs, the application program $A_3$ has the lowest priority. Next, the contention arbitration apparatus 1 compares the priorities of the application programs $A_3$ and $A_5$ (see step S206 of FIG. 10). In this example, the application program $A_5$ has a lower priority, and therefore the contention arbitration apparatus 1 makes a setting so as not to allow the application program $A_5$ to access the line logic device (see step S108 of FIG. 9).

Next, consider a case where the application program $A_2$ provides an access termination indication before both the application programs $A_4$ and $A_5$ provide an access indication to the line logic device. That is, there are two application programs A4 and A5 which require the line resource (step S502 of FIG. 13). The contention arbitration apparatus 1 recognizes which one of the application programs $A_4$ and $A_5$ has a higher priority (step S504 of FIG. 13). In this example, the application program $A_4$ has a higher priority. Accordingly, the contention arbitration apparatus 1 grants the application program $A_4$ an access right to the line resource, access to which has been granted to the application program $A_2$ (see step S505 of FIG. 13), thereby enabling the application program $A_4$ to access the line logic device (see step S406 of FIG. 12).

Next, the flow of processes described with reference to FIGS. 9 through 13 are specifically described with respect to correspondence among the application programs, the logic devices, the resources, and the physical device which are illustrated in FIG. 4. In FIG. 4, it is assumed that the application program $A_1$ has already been allowed to access the SDSP recording logic device, for example. Now, consider a case where the application program $A_3$ provides an access start indication to the SDSP reproduction logic device. In this case, the application program $A_1$ has a higher priority than the application program $A_3$, and the application programs $A_1$ and $A_3$ use the same codec scheme X. Further, the SDSP codec resource has additional codec information which indicates a codec scheme to be used, and the SDSP codec resource grants simultaneous multiple accesses from application programs using the same codec scheme.

In the case where multiple access is not effected by the SDSP codec resource, when an access right to the SDSP codec resource has already been granted to the application program $A_1$, the contention arbitration apparatus 1 compares the priorities of the application programs $A_1$ and $A_3$ (see step S206 of FIG. 10). In this example, the application program $A_1$ has a higher priority than the application program $A_3$. Accordingly, the application program $A_3$ is not granted the access right to the SDSP codec resource.

On the other hand, in the case where multiple resource is effected by the SDSP codec resource effects, there is a possibility that the application program $A_3$ might be granted the access right. Accordingly, the contention arbitration apparatus 1 compares the type of the codec scheme set for the SDSP codec resource and the type of the codec scheme used by the application program $A_3$ (see step S205 of FIG. 10). In this example, the same code scheme X is used by the SDSP codec resource and the application program $A_3$, and therefore the contention arbitration apparatus 1 grants the application program $A_3$ the access right to the SDSP codec resource (step S208 of FIG. 10), thereby enabling the application program $A_3$ to access the SDSP reproducing logic device.

Next, consider a case where the application program $A_2$ provides an access start indication to the SDSP recording logic device. In this example, the priority of the application program $A_2$ is lower than that of the application program $A_1$ and higher than that of the application program $A_3$.

First, the contention arbitration apparatus 1 compares the type of the codec scheme set for the SDSP codec resource and the type of the codec scheme used by the application program $A_2$ (see step S205 of FIG. 10). Here, it is assumed that the application program $A_2$ uses a codec scheme Y which is different from the codec scheme X used by the application programs $A_1$ and $A_3$. In this case, the type of the codec scheme which is the attribute of the SDSP codec resource is different from the type of the codec scheme used by the application program $A_2$, and therefore the application program $A_2$ is not able to obtain access right to the SDSP codec resource. Thus, the application program $A_2$ is not allowed to access the SDSP recording logic device (step S108 of FIG. 9).

On the other hand, in the case where the application program $A_2$ uses the same codec scheme as the codec scheme X used by the application programs $A_1$ and $A_3$, the type of the codec scheme which is the attribute of the SDSP codec resource is the same as the type of the codec scheme used by the application program $A_2$, and therefore the application program $A_2$ is able to obtain the access right to the SDSP codec resource (see step S205 of FIG. 10). However, the application program $A_1$ still maintains the access right to the SDSP recording resource, and therefore the application program $A_2$ is not able to obtain access rights to all the necessary resources (see step S105 of FIG. 9). Thus, the application program $A_2$ is not allowed to access the SDSP recording logic device (see step S108 of FIG. 9).

Next, consider a case where the application program $A_1$ provides an access termination indication. In the case where the application program $A_2$ requires the access right to the SDSP recording resource (see step S502 of FIG. 13), the contention arbitration apparatus 1 grants the access right to the application program $A_2$ (step S505 of FIG. 13).

Alternatively, in the case where the application programs $A_2$ and $A_3$ require the access right to the SDSP codec resource (see step S502 of FIG. 13), the contention arbitration apparatus 1 compares the priorities of the application programs $A_2$ and $A_3$ (see step S504 of FIG. 13). Since the application program $A_2$ has a higher priority than the application program $A_3$, the contention arbitration apparatus 1 grants the application program $A_2$ the access right to the SDSP codec resource (see step S505 of FIG. 13). In this case, the type of the codec scheme of the application program A2 is different from the type of the codec system set for the SDSP codec resource, and therefore the contention arbitration apparatus 1 resets the codec type of the SDSP codec resource.

Next, the contention arbitration apparatus 1 compares the codec type newly set for the SDSP codec resource and the type of the codec scheme used by the application program $A_3$ (see step S505 of FIG. 13). In this example, the application programs $A_2$ and $A_3$ use different types of codec schemes, and therefore the contention arbitration apparatus 1 makes a setting so as not to allow the application program $A_3$ to access the SDSP codec resource. Thus, the application program $A_3$ is not able to access the SDSP reproducing logic device.

As described above, in the present embodiment, the contention arbitration apparatus manages logic devices specified by application programs, physical devices actually present in a system, resources for associating the logic devices with the physical devices, thereby managing functions of the physical devices and functions desired by application programs, and the contention apparatus according to the first aspect uses a method of arbitrating contention for access from the application programs to the physical devices for each resource. Thus, it is possible to provide a contention arbitration apparatus and method which can be flexibly adapted to a change of the physical devices only by changing the resource and device information stored in the contention arbitration apparatus. Further, in the present embodiment, the contention arbitration is conducted for each resource associated with the functions of the physical devices. Thus, it is possible to provide a contention arbitration apparatus and method which is capable of fully utilizing the advantages of the physical devices even if the physical devices have a variety of characteristics.

For example, in the case of using the line physical device which effects multiple access within a prescribed limit, or in the case of using the SDSP physical device having an SDSP codec function which effects multiple access when a prescribed condition is satisfied, the contention arbitration apparatus according to the present embodiment is able to grant a plurality of application programs an access right to such a device. In this manner, the contention arbitration apparatus according to the present embodiment is able to conduct contention arbitration so as to fully utilize the advantages of the physical devices.

Further, even in the case of using the loudspeaker physical device connected to other physical devices or in the case of using a physical device which does not have its own I/O port and is shared between a plurality of physical devices, the contention arbitration apparatus according to the present embodiment is able to arbitrate contention of access to the physical devices.

Furthermore, the contention apparatus according to the present embodiment has a mechanism in which when an application program provides an access indication, if access is allowed, a device driver is executed, and if access is not allowed, an error message is returned to the application program. Accordingly, the application program is only required to handle errors caused when providing the access indication. Such a mechanism reduces application program developers' burden in development of products.

Further still, the contention apparatus according to the present embodiment conducts contention arbitration based on priorities assigned to application programs. In particular, when accessing a physical device which effects multiple access, the application programs are allowed to the physical device in the decreasing order of priority. Thus, it is possible to realize complicated exclusive control based on the priorities.

Further still, whether the application programs are allowed to access the physical device is registered in the application information, and therefore it is not necessary to determine whether access is allowed each time an access indication is provided, leading to an increase in processing speed.

Further still, in the case where an access right to a physical device owned by an application program is taken by another application program having provided an access indication, if access to the physical device becomes available before the application program having previously owned the access right provides an access indication, no special process is required for allowing the application program to access the physical device without being notified that the access to the physical device has been temporarily unavailable.

Further still, in the case of using an application program which implements a desired function by simultaneously controlling a plurality of physical devices, it is necessary for the application program to be allowed to access to the plurality of physical devices in order to implement the desired function. As in the case of the present embodiment, if access rights are managed for each resource, it is possible to execute device drivers required for accessing all the plurality of physical devices, thereby implementing the desired function. Moreover, if even one physical device is unable to be accessed, the contention arbitration apparatus according to the present embodiment notifies the application program of an error.

The physical devices, the logical devices, and the resources which are described in the present embodiment are merely examples and are not intended to be limiting.

In the present embodiment, the resource access determining section grants an application program, which has a high priority, an access right to a resource. Further, there source access determining section may determine an application program to which an access right is granted based on first-in, first-out information which indicates whether an access right is granted to an application program which provides an access indication first or last. Alternatively, the resource access determining section may determine the application program to which an access right is granted based on the first-in, first-out information only when application programs which attempt to access have the same priority as each other.

The contention arbitration apparatus according to the present embodiment makes a setting of allowing an application program to access a desired logic device only when the application program is granted access rights to all the resources required by the desired logic device (see steps S105 and S106 of FIG. 9). However, even in the case where the application program is not granted access rights to all the resources, if the application program is partially granted access rights to such resources, functions of the desired logic device can be partially implemented. Accordingly, in order to partially implement the functions of the desired logic device, the contention arbitration apparatus according to the present embodiment may allow the application program to access available resources even when not all the resources required by the logic device are available.

Figure 14:
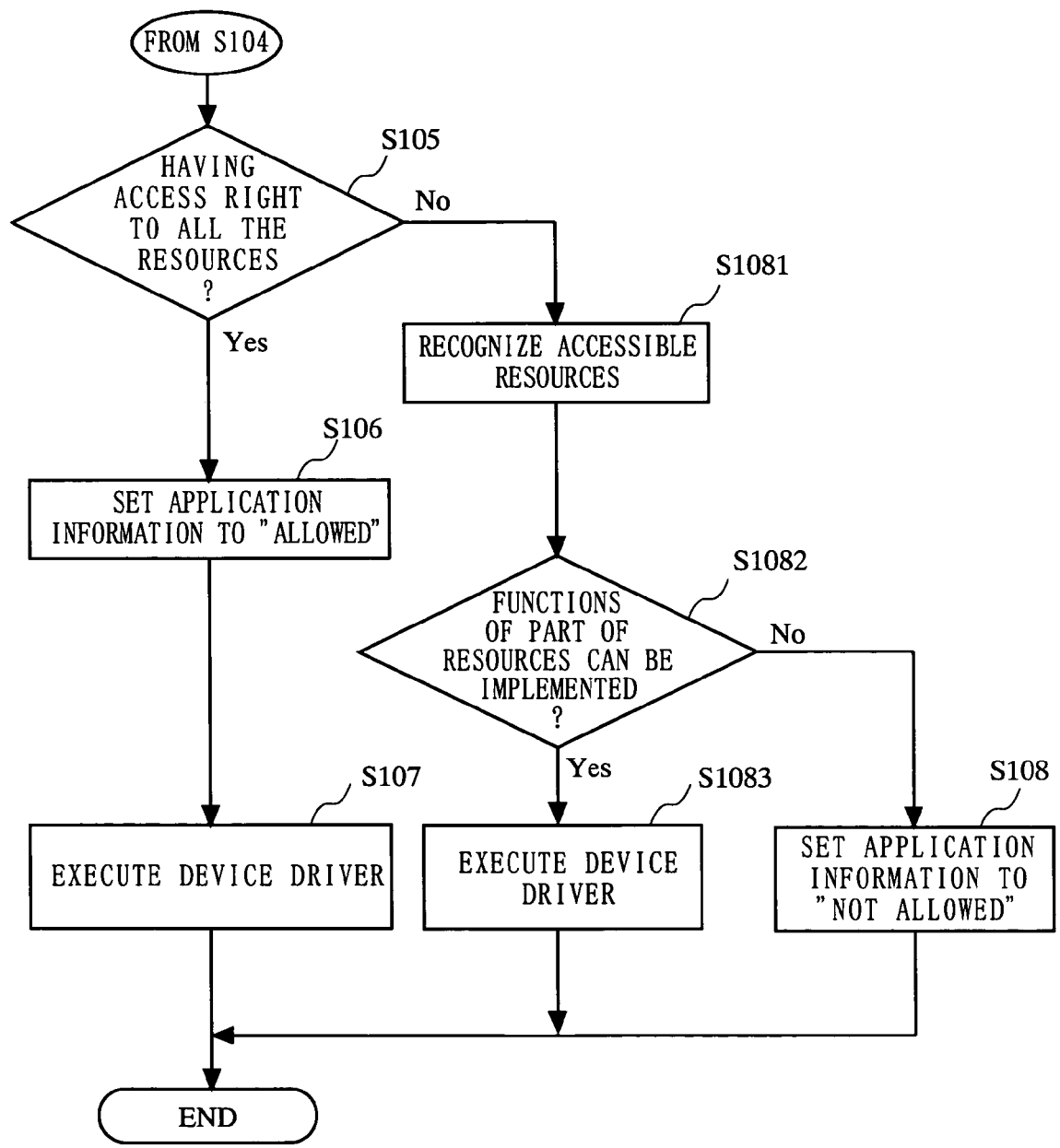
FIG. 14 is a flowchart illustrating the operation of the contention arbitration apparatus 1 which allows an application program to access available resources even when not all the resources required by a desired logic device are available.

FIG. 14 is a flowchart illustrating the operation of the contention arbitration apparatus 1 which allows an application program to access available resources even when not all the resources required by a desired logic device are available. The steps shown in the flowchart of FIG. 14 are alternatives to steps S105 through S108 of FIG. 9. In FIG. 14, steps for processes similar to those of steps of FIG. 9 are denoted by the same step numbers, and the descriptions thereof are omitted.

At step S105, when the contention arbitration apparatus 1 determines that an application program which has provided an access start indication does not have access rights to all the resources required by an access target logic device, the procedure proceeds to step S1081. At step S1081, the executing section 17 of the contention arbitration apparatus 1 determines and recognizes resources which can be accessed by the application program from among all the resources required by the access target logic device. Then, from among the resources recognized at step S1081, the executing section 17 determines a resource which can be used individually (step S1082). In this case, the executing section 17 performs the above determination based on information which is additionally added to the resource information in order to indicate whether the resource can be used individually.

If there is any resource which can be used individually, the executing section 17 causes the device driver executing section 5 to execute a device driver so as to implement the function of the resource (step S1083), thereby terminating the procedure. On the other hand, when there is no resource which can be used individually, the executing section 17 updates the application information stored in the application information storing section 12 such that accessibility information related to the application program is set to "NOT ALLOWED" (step S108), thereby terminating the procedure.

As described above, in the case where a part of desired functions can be implemented even if access to all the physical devices is not allowed, the contention arbitration apparatus 1 is able to execute a device driver so as to allow the application program to partially implement the desired functions.

As described above, the contention arbitration apparatus, method and program of the present invention is able to fully utilize the advantages of a physical device and is flexibly adaptable to a change of physical devices, and therefore can be advantageously used in a computer system or the like in which a plurality of application programs are used.

While the invention has been described in detail, the foregoing description is in all aspects illustrative and not restrictive. It is understood that numerous other modifications and variations can be devised without departing from the scope of the invention.

What is claimed is:

1. A contention arbitration apparatus for arbitrating an access contention caused when a plurality of application programs simultaneously attempt to access at least one physical device, said contention arbitration apparatus comprising:

a resource information storing section for storing resource information which indicates a correspondence between at least one resource, which defines functions of the at least one physical device, and at least one application program, which is allowed to use functions associated with the at least one resource;

a device information storing section for storing device information which indicates a correspondence between a logic device, which defines functions specified by the at least one application program which attempts to access the at least one physical device, and the at least one resource which defines functions required for implementing functions defined by the logic device;

a used resource recognizing section for recognizing a resource associated with the logic device specified by the at least one application program by reference to the device information;

a resource access determining section for determining, by reference to the resource information, which application program is allowed to access the resource recognized by said used resource recognizing section; and a device access determining section for determining, based on a determination result provided by said resource access determining section, whether the application program which has specified the logic device is able to access the at least one physical device which implements the functions defined by the logic device.

2. The contention arbitration apparatus according to claim 1, wherein the resource information contains multiple access information which indicates whether to allow simultaneous accesses from a plurality of application programs, and wherein when the simultaneous accesses from the plurality of application programs are allowed, said resource access determining section is operable to allow the plurality of application programs to access the resource based on the multiple access information.

3. The contention arbitration apparatus according to claim 2, wherein said resource access determining section is operable to allow the plurality of application programs to access the resource only when a prescribed condition is satisfied.

4. The contention arbitration apparatus according to claim 3, wherein the prescribed condition is that the plurality of application programs use the same scheme to implement a function provided by the resource.

5. The contention arbitration apparatus according to claim 1, further comprising an executing section for executing a device driver for controlling the at least one physical device when said device access determining section determines that the at least one application program which has specified the logic device is allowed to access the at least one physical device.

6. The contention arbitration apparatus according to claim 5, wherein said executing section is operable to send an error message to the at least one application program having specified the logic device when said access determining section determines that the at least one application is not allowed to access the at least one physical device.

7. The contention arbitration apparatus according to claim 1, wherein said resource access determining section is operable to determine which application program is allowed to access the at least one physical device based on priorities of the plurality of application programs.

8. The contention arbitration apparatus according to claim 7, further comprising an application information storing section for storing information about the priorities of the plurality of application programs.

9. The contention arbitration apparatus according to claim 7,
wherein the resource information contains additional information which indicates whether to grant an access right to an application program having provided an access indication first or last; and
wherein when the plurality of application programs have the same priorities, said resource access determining section is operable to determine which one of the application programs is to be granted the access right based on the additional information.

10. The contention arbitration apparatus according to claim 1, further comprising:
an application information storing section for storing, as application information, a correspondence between a determination result obtained by said device access determining section and the plurality of application programs; and
an executing section for executing a device driver for controlling the at least one physical device,
wherein when an access start indication is provided by an application program to specify the logic device, said device access determining section is operable to determine whether the application program is able to access the at least one physical device and store a determination result into said application information storing section; and
wherein when an access indication is provided after the access start indication, said executing section is operable to refer to the application information stored in said application information storing section to determine whether the application program is able to access the at least one physical device.

11. The contention arbitration apparatus according to claim 10, wherein when an access indication is provided by an application program which is not able to access the at least one physical device, said executing section is operable to send an error message to the application program.

12. The contention arbitration apparatus according to claim 10, wherein when an access indication is provided by an application program which is not allowed to access the at least one physical device since access to the at least one physical device is granted to another application program, said executing section is operable to send an error message to the application program.

13. The contention arbitration apparatus according to claim 1,
wherein upon receipt of an access termination indication from the at least one application program, said resource access determining section is operable to grant an access right to another application program which attempts to use the functions associated with the resource and update the resource information such that a result of the grant of the access right is reflected in the resource information; and
wherein said device access determining section is operable to determine whether the another application program is able to access the at least one physical device based on the resource information updated by said resource access determining section.

14. The contention arbitration apparatus according to claim 13, further comprising:
an application information storing section for storing, as application information, a correspondence between a determination result obtained by said device access determining section and the plurality of application programs; and
an executing section for updating the application information based on the determination result obtained by said device access determining section.

15. The contention arbitration apparatus according to claim 13, further comprising an executing section for changing a setting of a device driver when said device access determining section determines that the another application program is able to access the at least one physical device, the setting being changed such that the another application program is allowed to access the at least one physical device.

16. The contention arbitration apparatus according to claim 1, wherein when only the at least one application program, which specifies the logic device, is allowed to use the functions associated with all the resources associated with the logic device, said device access determining section is operable to determine that the at least one application program is allowed to use the at least one physical device.

17. The contention arbitration apparatus according to claim 1, wherein when only the at least one application program, which specifies the logic device, is associated with a part of the resources associated with the logic device, said device access determining section is operable to determine that the at least one application program is allowed to use functions defined by the part of the resources when accessing the at least one physical device.

18. The contention arbitration apparatus according to claim 1, further comprising an application I/F section for accepting a specification of the logic device from the at least one application program.

19. The contention arbitration apparatus according to claim 1,
wherein the resource information contains additional information which indicates for each resource whether to grant an access right to an application program having provided an access indication first or last; and
wherein said resource access determining section is operable to determine which application program is granted the access right based on the additional information.

20. A contention arbitration program, stored in a memory, for causing a computing apparatus to arbitrate an access contention caused when a plurality of application programs simultaneously attempt to access at least one physical device, the computing apparatus having stored therein resource information which indicates a correspondence between at least one resource, which defines functions of the at least one physical device, and at least one application program, which is allowed to use functions associated with the at least one resource, and also having stored therein device information which indicates a correspondence between a logic device, which defines functions specified by the at least one application program which attempts to access the at least one physical device, and the at least one resource which defines functions required for implementing functions defined by the logic device, said contention arbitration program causing the computing apparatus to perform a contention arbitration method comprising:

recognizing a resource associated with the logic device specified by the at least one application program by reference to the device information;

determining, by reference to the resource information, which application program is allowed to access the recognized resource; and determining, based on a determination result obtained in said determining, by reference to the resource information, which application program is allowed to access the recognized resource, whether the application program which has specified the logic device is able to access the at least one physical device which implements the functions defined by the logic device.

21. A contention arbitration method for causing a computing apparatus to arbitrate an access contention caused when a plurality of application programs, stored in a memory, simultaneously attempt to access at least one physical device, the computing apparatus having stored therein resource information which indicates a correspondence between at least one resource, which defines functions of the at least one physical device, and at least one application program, which is allowed to use functions associated with the at least one resource, and also having stored therein device information which indicates a correspondence between a logic device, which defines functions specified by the at least one application program which attempts to access the at least one physical device, and the at least one resource which defines functions required for implementing functions defined by the logic device, said contention arbitration method comprising:

recognizing a resource associated with the logic device specified by the at least one application program by reference to the device information;

determining, by reference to the resource information, which application program is allowed to access the recognized resource; and determining, based on a determination result obtained in said determining, by reference to the resource information, which application program is allowed to access the recognized resource, whether the application program which has specified the logic device is able to access the at least one physical device which implements the functions defined by the logic device.

* * * * *